US 6,681,140 B1

(12) United States Patent
Heil

(10) Patent No.: US 6,681,140 B1
(45) Date of Patent: Jan. 20, 2004

(54) SYSTEM FOR CALCULATING FLOOR PLAN INFORMATION AND AUTOMATICALLY NOTCHING, CUTTING AND TRANSFERRING INFORMATION ONTO FRAMING COMPONENTS

(76) Inventor: Edwin D. Heil, 2828 River Band, Kingwood, TX (US) 77339

(*) Notice: Subject to any disclaimer, the term of this patent is extended or adjusted under 35 U.S.C. 154(b) by 0 days.

(21) Appl. No.: 09/601,230

(22) PCT Filed: Mar. 2, 1998

(86) PCT No.: PCT/US98/03985
§ 371 (c)(1),
(2), (4) Date: Jul. 31, 2000

(87) PCT Pub. No.: WO99/39297
PCT Pub. Date: Aug. 5, 1999

Related U.S. Application Data

(63) Continuation-in-part of application No. 07/587,960, filed on Jan. 17, 1996.
(60) Provisional application No. 60/073,101, filed on Jan. 30, 1998.

(51) Int. Cl.⁷ .............................................. G06F 19/00
(52) U.S. Cl. ........................................ 700/95; 700/160
(58) Field of Search .............................. 700/95, 96–97, 700/118, 167, 182

(56) References Cited

U.S. PATENT DOCUMENTS

| | | | | |
|---|---|---|---|---|
| 4,243,082 A | * | 1/1981 | Paris, Jr. et al. | 144/133.1 |
| 4,326,572 A | * | 4/1982 | Ingram et al. | 144/371 |
| 5,195,412 A | * | 3/1993 | Flemming et al. | 83/37 |
| 5,574,651 A | * | 11/1996 | McKeegan et al. | 700/160 |
| 5,724,246 A | * | 3/1998 | Heil | 700/167 |
| 5,862,584 A | * | 1/1999 | Manser | 29/560 |

* cited by examiner

Primary Examiner—Leo Picard
Assistant Examiner—Zoila Cabrera
(74) Attorney, Agent, or Firm—Law Offices of Royal W. Craig

(57) ABSTRACT

An integrated system for modeling framed structures, quantifying framing information, and for automatically cutting and notching framing components (or alternatively for transferring a marking layout onto framing components for subsequent controlled cutting, notching, and placement). The system defines parametric models for a plurality of discrete wall panel components and wall panels incorporating the discrete wall panel component models. The system then defines an intersecting spatial relationship while tracking user progress to ensure completion, and compiles an overall parametric model. Once the model is completed, the system compiles design data and produces command signals which are fed to an automatic notching station for coordinating and controlling operation thereof. The notching station then automatically cuts and notches the framing components. Alternatively, the design data is used to produce command signals for a printer which transfers a marking layout onto framing components for subsequent controlled cutting, notching, and placement.

8 Claims, 42 Drawing Sheets

FIG. 5

Beam Configuration

Beam Configuration
- ● Flush  8' 1 1/8 "
- ○ Drop  7' 1 7/8"
- ○ User  0

Plys: 1 2 3 4 5

Elevation  97.125
Material Type  1-3/4 x 11-1/4 LVL PARALLAM

Beam Post Specs

| | Material Type | Plys | |
|---|---|---|---|
| A End | 2 x 4 2 SPF | 2 | L ▼ |
| B End | 2 x 4 2 SPF | 2 | L ▼ |
| Mid | | | Combo ▼ |

Flitch Type ____  Plys ____
Fasteners ____  OC ____

Beam Loading Specs

A Reaction ____
B Reaction ____

Beam Length
Beam Width
A Hanger ____
B Hanger ____

Current Lumber: 1 - 3/4 x 11 - 1/4 LVL PARALLA    [CHANGE LUMBER]

[EXIT]

FIG. 12

Opening Cut List

Included Units

| Unit Name | Unit Count |
|---|---|
| bot3js10 | 1 |
| bot3js11 | 1 |
| BOL3JS12 | 1 |

Opening Count

| Opening Name | Count |
|---|---|
| 10- 92.625- 5.5 | 1 |
| 13- 92.625- 5.5 | 1 |
| 15- 92.625- 5.5 | 1 |
| 2- 92.625- 5.5 | 1 |
| 5- 92.625- 5.5 | 1 |
| 8- 92.625- 5.5 | 2 |
| BD- 92.625- 3.5 | 1 |
| BK- 92.625- 5.5 | 1 |
| BM- 92.625- 5.5 | 2 |
| BO- 92.625- 5.5 | 1 |
| BP- 92.625- 3.5 | 1 |
| BP3T- 92.625- 5.5 | 2 |
| BP4A- 92.625- 5.5 | 1 |
| DRHW- 92.625- 3.5 | 1 |
| DRLR- 92.625- 3.5 | 1 |
| N37- 92.625- 3.5 | 1 |
| NE- 92.625- 3.5 | 3 |
| NF- 92.625- 3.5 | 1 |
| NG- 92.625- 3.5 | 1 |
| NJ- 92.625- 3.5 | 5 |
| NN- 92.625- 3.5 | 1 |
| NS- 92.625- 3.5 | 3 |

| Size | Grade | Length | Quantity |
|---|---|---|---|
| 2 x 4 | 2 SPF | 1 7/8" | 7 |
| 2 x 4 | 2 SPF | 30" | 2 |
| 2 x 4 | 2 SPF | 36 1/4" | 1 |
| 2 x 4 | 2 SPF | 5 7/8" | 6 |
| 2 x 4 | 2 SPF | 6 5/8" | 8 |
| 2 x 4 | 2 SPF | 63 3/4" | 1 |
| 2 x 4 | 2 SPF | 7 7/8" | 51 |
| 2 x 4 | 2 SPF | 72 1/4" | 2 |

FIG. 18

Opening Assembly List

| Included Units | |
|---|---|
| Unit Name | Unit Count |
| bol3js10 | 1 |
| bol3js11 | 1 |
| BOL3JS12 | 1 |

| Opening Count | |
|---|---|
| Opening Name | Count |
| 10- 92.625- 5.5 | 1 |
| 13- 92.625- 5.5 | 1 |
| 15- 92.625- 5.5 | 1 |
| 2- 92.625- 5.5 | 1 |
| 5- 92.625- 5.5 | 1 |
| 8- 92.625- 5.5 | 2 |
| BD- 92.625- 3.5 | 1 |
| BK- 92.625- 5.5 | 1 |
| BM- 92.625- 5.5 | 2 |
| BO- 92.625- 5.5 | 1 |
| BP- 92.625- 3.5 | 1 |
| BP3T- 92.625- 5.5 | 2 |
| BP4A- 92.625- 5.5 | 1 |
| DRHW- 92.625- 3.5 | 1 |
| DRLR- 92.625- 3.5 | 1 |
| N37- 92.625- 3.5 | 1 |
| NE- 92.625- 3.5 | 3 |
| NF- 92.625- 3.5 | 1 |
| NG- 92.625- 3.5 | 1 |
| NJ- 92.625- 3.5 | 5 |
| NN- 92.625- 3.5 | 1 |
| NS- 92.625- 3.5 | 3 |

| | Part | Size | Grade | Length | Total Pcs |
|---|---|---|---|---|---|
| 10- 92.625- 5.5 | | 2 x 4 | 2 SPF | 30" | 1 |
| | Header Cripple | 2 x 6 | 2 SPF | 2 1/2" | 3 |
| | Sill Cripple | 2 x 6 | 2 SPF | 41 3/8" | 3 |
| | Header Filch | 2 x 6 | STUD SPF | 78 7/8" | 2 |
| | Stud | 2 x 6 | STUD SPF | 92 5/8" | 2 |
| | Header | 2 x 12 | 2 SYP | 33" | 1 |
| 13- 92.625- 5.5 | | 2 x 4 | 2 SPF | 30" | 1 |
| | Header Cripple | 2 x 6 | 2 SPF | 2 1/16" | 3 |
| | Sill Cripple | 2 x 6 | 2 SPF | 25 13/16" | 3 |

FIG. 19

Sheathing Cut List

Included Units

| Unit Name | Unit Count |
|---|---|
| bol3js10 | 1 |
| bol3js11 | 1 |
| BOL3JS12 | 1 |

| Unit | Size | Grade | Width | Length | Count |
|---|---|---|---|---|---|
| BOL3JS1 | 7/16 | OSB | 10 3/8" | 96 | 1 |
| bol3js10 | 7/16 | OSB | 13 1/2" | 19.75 | 1 |
| BOL3JS1 | 7/16 | OSB | 13 7/8" | 96 | 2 |
| bol3js11 | 7/16 | OSB | 15 3/4" | 15.1875 | 1 |
| bol3js11 | 7/16 | OSB | 15 3/4" | 28.8125 | 1 |
| bol3js10 | 7/16 | OSB | 19 1/4" | 96 | 2 |
| BOL3JS1 | 7/16 | OSB | 24 1/4" | 15.625 | 2 |
| BOL3JS1 | 7/16 | OSB | 24 1/4" | 20.125 | 2 |
| BOL3JS1 | 7/16 | OSB | 24" | 96 | 2 |
| bol3js11 | 7/16 | OSB | 27 1/4" | 14.25 | 1 |
| bol3js10 | 7/16 | OSB | 3 1/4" | 13.25 | 1 |
| bol3js11 | 7/16 | OSB | 30" | 15.1875 | 1 |
| BOL3JS1 | 7/16 | OSB | 30" | 15.625 | 1 |
| bol3js11 | 7/16 | OSB | 30" | 28.8125 | 1 |
| BOL3JS1 | 7/16 | OSB | 30" | 44.375 | 1 |
| bol3js11 | 7/16 | OSB | 31" | 96 | 2 |
| BOL3JS1 | 7/16 | OSB | 32 1/8" | 96 | 1 |
| bol3js10 | 7/16 | OSB | 34" | 96 | 1 |
| bol3js11 | 7/16 | OSB | 36 1/4" | 15.1875 | 1 |
| BOL3JS1 | 7/16 | OSB | 36 1/4" | 15.625 | 1 |
| BOL3JS1 | 7/16 | OSB | 36 1/4" | 20.125 | 1 |
| bol3js11 | 7/16 | OSB | 36 1/4" | 28.8125 | 1 |
| BOL3JS1 | 7/16 | OSB | 38 7/8" | 96 | 1 |
| BOL3JS1 | 7/16 | OSB | 4 1/2" | 96 | 1 |
| BOL3JS1 | 7/16 | OSB | 4 3/4" | 96 | 1 |
| bol3js11 | 7/16 | OSB | 4 3/8" | 96 | 1 |

FIG. 20

Lumber Takeoff:

Included Units

| Unit Name | Unit Count |
|---|---|
| bol3js10 | 1 |
| bol3js11 | 1 |
| BOL3JS12 | 1 |

| Size | Grade | Bd_Len | Description | Each | Cost / m | Quantity | Total |
|---|---|---|---|---|---|---|---|
| 2 x 4 | 4 | 1 | BLOCK | .34 | 0.5 | 3 | $1.02 |
| 2 x 4 | 4 | 2 | BLOCK | .67 | 0.5 | 2 | $1.34 |
| 2 x 4 | 1SS SYP | 2 | 2X4X8#1 SYP | .73 | 0.55 | 159 | $116.07 |
| 2 x 4 | 1SS SYP | 8 | 2X4X92-5/8 #1 SS SYP | 2.19 | 0.41 | 52 | $113.88 |
| 2 x 4 | 2 SPF | 1 | 2 x 4 x 8 #2 SPF | .27 | 0.41 | 79 | $21.33 |
| 2 x 4 | 2 SPF | 10 | 2 x 4 x 12 #2 SPF | 2.97 | 0.445 | 16 | $47.52 |
| 2 x 4 | 2 SPF | 12 | 2 x 4 x 12 #2 SPF | 3.56 | 0.445 | 15 | $53.40 |
| 2 x 4 | 2 SPF | 14 | 2 x 4 x 12 #2 SPF | 4.15 | 0.445 | 4 | $16.60 |
| 2 x 4 | 2 SPF | 2 | 2 x 4 x 8 #2 SPF | .55 | 0.41 | 53 | $29.15 |
| 2 x 4 | 2 SPF | 3 | 2 x 4 x 8 #2 SPF | .82 | 0.41 | 20 | $16.40 |
| 2 x 4 | 2 SPF | 4 | 2 x 4 x 8 #2 SPF | 1.09 | 0.41 | 13 | $14.17 |
| 2 x 4 | 2 SPF | 5 | 2 x 4 x 8 #2 SPF | 1.37 | 0.41 | 5 | $6.85 |
| 2 x 4 | 2 SPF | 6 | 2 x 4 x 8 #2 SPF | 1.64 | 0.41 | 10 | -$16.40 |
| 2 x 4 | 2 SPF | 7 | 2 x 4 x 8 #2 SPF | 1.91 | 0.41 | 9 | $17.19 |
| 2 x 4 | 2 SPF | 8 | 2 x 4 x 92-5/8 #2 SPF | 2.19 | 0.41 | 161 | $352.95 |
| 2 x 4 | 2 SYP | 2 | 2x4x8 #2 SYP | .67 | 0.5 | 3 | $2.01 |
| 2 x 4 | 2 SYP | 3 | 2x4x8 #2 SYP | 1. | 0.5 | 14 | $14.00 |
| 2 x 4 | 2 SYP | 4 | 2x4x8 #2 SYP | 1.34 | 0.5 | 3 | $4.02 |
| 2 x 4 | 3 SPF | 1 | 2x4x8 #3 SPF | .4 | 0.595 | 10 | $4.00 |
| 2 x 4 | 3 SPF | 12 | 2x4x12 #3 SPF | 4.76 | 0.595 | 2 | $9.52 |
| 2 x 4 | 3 SPF | 14 | 2x4x12 #3 SPF | 5.55 | 0.595 | 4 | $22.20 |
| 2 x 4 | 3 SPF | 16 | 2x4x12 #3 SPF | 6.35 | 0.595 | 3 | $19.05 |
| 2 x 4 | 3 SPF | 2 | 2x4x8 #3 SPF | .79 | 0.595 | 5 | $3.95 |
| 2 x 4 | 3 SPF | 3 | 2x4x8 #3 SPF | 1.19 | 0.595 | 6 | $7.14 |
| 2 x 4 | 3 SPF | 4 | 2x4x8 #3 SPF | 1.59 | 0.595 | 5 | $7.95 |

FIG. 21

Lumber Used For Pricing

Included Units

| Unit Name | Unit Count |
|---|---|
| bd3js10 | 1 |
| bd3js11 | 1 |
| BOL3JS12 | 1 |

| Sku | Size | Grade | Bd Len | Cost | Quantity |
|---|---|---|---|---|---|
| *000200040000800002SPF* | 2 x 4 | 2 SPF | 7 | 0.41 | 193 |
| *000200040000800002SYP* | 2 x 4 | 2 SYP | 3 | 0.5 | 20 |
| *000200040000800003SPF* | 2 x 4 | 3 SPF | 3 | 0.595 | 35 |
| *000200040000800003TPN* | 2 x 4 | 3 TREATED PINE | 4 | 0.5 | 12 |
| *0002000400008000 4* | 2 x 4 | 4 | 2 | 0.5 | 5 |
| *000200040000800ISSSYP* | 2 x 4 | 1SS SYP | 2 | 0.55 | 159 |
| *000200040000800STUDSPF* | 2 x 4 | STUD SPF | 7 | 0.389 | 94 |
| *000200040001200002SPF* | 2 x 4 | 2 SPF | 12 | 0.445 | 37 |
| *000200040001200003SPF* | 2 x 4 | 3 SPF | 14 | 0.595 | 9 |
| *000200040001200003TPN* | 2 x 4 | 3 TREATED PINE | 10 | 0.5 | 7 |
| *000200040001200STUDSPF* | 2 x 4 | STUD SPF | 10 | 0.345 | 13 |
| *000200040925800002SPF* | 2 x 4 | 2 SPF | 8 | 0.41 | 155 |
| *0002000409258001SSSYP* | 2 x 4 | 1SS SYP | 8 | 0.41 | 52 |
| *000200040925800STUDSPF* | 2 x 4 | STUD SPF | 8 | 0.389 | 211 |
| *000200060000800002SPF* | 2 x 6 | 2 SPF | 2 | 0.41 | 176 |
| *000200060000800002SYP* | 2 x 6 | 2 SYP | 7 | 0.45 | 2 |
| *000200060000800003SPF* | 2 x 6 | 3 SPF | 1 | 0.375 | 9 |
| *000200060000800003TPN* | 2 x 6 | 3 TREATED PINE | 5 | 0.525 | 6 |
| *000200060000800ISSSYP* | 2 x 6 | 1SS SYP | 2 | 0.61 | 24 |
| *000200060000800STUDSPF* | 2 x 6 | STUD SPF | 7 | 0.39 | 63 |
| *000200060001200002SPF* | 2 x 6 | 2 SPF | 10 | 0.44 | 10 |
| *000200060001200003SPF* | 2 x 6 | 3 SPF | 14 | 0.375 | 4 |

FIG. 22

Pricing Report

Included Units

| Unit Name | Unit Count |
|---|---|
| bol3js10 | 1 |
| bol3js11 | 1 |
| BOL3JS12 | 1 |

Blocks

| | Grade | Length | Quantity | S/m | Bd Foot | Cost | Saw Cost | Fab Cost |
|---|---|---|---|---|---|---|---|---|
| 2 x 4 | 4 | 1 | 3 | 0.5 | 2.01 | $1.01 | $0.15 | $0.26 |
| 2 x 4 | 4 | 2 | 2 | 0.5 | 2.66 | $1.33 | $0.11 | $0.20 |
| 2 x 4 | 2 SPF | 1 | 1 | 0.41 | 0.67 | $0.27 | $0.05 | $0.09 |
| 2 x 6 | 2 SPF | 1 | 2 | 0.41 | 2.00 | $0.82 | $0.11 | $0.19 |
| 2 x 6 | 2 SPF | 2 | 3 | 0.41 | 6.00 | $2.46 | $0.20 | $0.33 |
| | | Category Total: | | | 13.34 | $5.89 | $0.61 | $1.07 |

Opening

| | Grade | Length | Quantity | S/m | Bd Foot | Cost | Saw Cost | Fab Cost |
|---|---|---|---|---|---|---|---|---|
| 2 x 4 | 2 SPF | 1 | 72 | 0.41 | 48.24 | $19.78 | $3.51 | $6.27 |
| 2 x 4 | 2 SYP | 2 | 3 | 0.5 | 3.99 | $2.00 | $0.17 | $0.30 |
| 2 x 4 | 2 SYP | 3 | 14 | 0.5 | 28.00 | $14.00 | $0.92 | $1.55 |
| 2 x 4 | 2 SYP | 4 | 3 | 0.5 | 8.01 | $4.01 | $0.22 | $0.37 |
| 2 x 4 | STUD SPF | 7 | 42 | 0.389 | 196.14 | $76.30 | $4.23 | $6.68 |
| 2 x 4 | STUD SPF | 8 | 42 | 0.389 | 223.86 | $87.08 | $2.19 | $7.18 |
| 2 x 6 | 2 SPF | 1 | 58 | 0.41 | 58.00 | $23.78 | $3.07 | $5.39 |
| 2 x 6 | 2 SPF | 2 | 16 | 0.41 | 32.00 | $13.12 | $1.06 | $1.78 |
| 2 x 6 | 2 SPF | 3 | 12 | 0.41 | 36.00 | $14.76 | $0.95 | $1.55 |
| 2 x 6 | 2 SPF | 4 | 3 | 0.41 | 12.00 | $4.92 | $0.28 | $0.44 |
| 2 x 6 | 2 SYP | 7 | 2 | 0.45 | 14.00 | $6.30 | $0.26 | $0.40 |
| 2 x 6 | STUD SPF | 4 | 1 | 0.39 | 4.00 | $1.56 | $0.09 | $0.15 |
| 2 x 6 | STUD SPF | 7 | 48 | 0.39 | 336.00 | $131.04 | $6.29 | $9.65 |
| 2 x 6 | STUD SPF | 8 | 28 | 0.39 | 224.00 | $87.36 | $1.15 | $6.13 |
| 2 x 12 | 2 SYP | 10 | 2 | 0.595 | 40.00 | $23.80 | $0.60 | $0.87 |
| 2 x 12 | 2 SYP | 3 | 2 | 0.595 | 12.00 | $7.14 | $0.24 | $0.37 |

FIG. 23

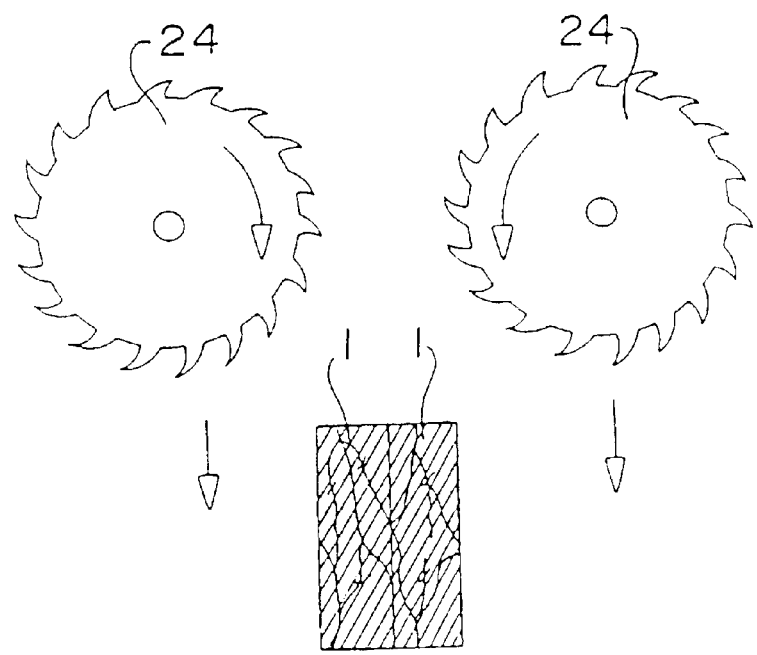
FIG. 29
FIG. 30
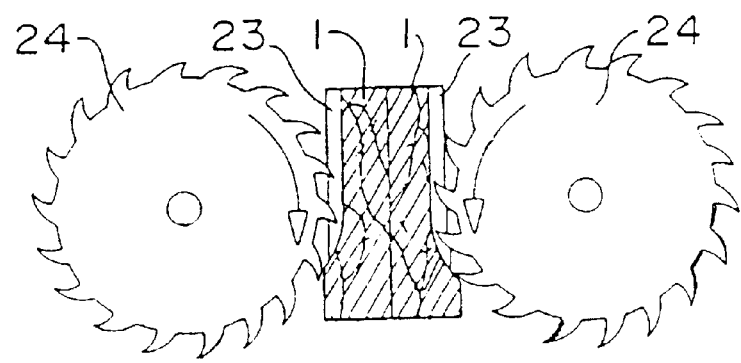

SYSTEM FOR CALCULATING FLOOR PLAN INFORMATION AND AUTOMATICALLY NOTCHING, CUTTING AND TRANSFERRING INFORMATION ONTO FRAMING COMPONENTS

CROSS-REFERENCE TO RELATED APPLICATIONS

The present application derives priority from U.S. Provisional Patent Application No. 60/073,101 filed Jan. 30, 1998, is a continuation-in-part of U.S. application Ser. No. 07/587,960 filed Jan. 17, 1996, and corresponds to International Application No. PCT/US98/03985 filed Feb. 3, 1998.

TECHNICAL FIELD

The present invention relates to computer automation of the building construction process and, more particularly, to an integrated system for modeling framed structures and for quantifying framing information, and including a method and device to automatically cut and notch framing components, and/or to directly transfer a marking layout onto framing components for subsequent controlled cutting, notching, and placement.

BACKGROUND ART

Light framing (commonly referred to as "stick framing") is a common method for the construction of buildings having up to four stories. Stick framing is typically performed on-site, hand-assembly of the components being performed by experienced carpenters using raw materials of random dimensions. The placement of the sticks in the building is determined by blueprints, shop drawings or other construction documents. Unfortunately, these hard copy construction documents lead to several drawbacks. First, the frequency of changes makes them cumbersome. Second, mistakes may easily be made by the layout man when reading and transferring the information from the shop drawing to the plates. Third, mistakes may easily be made by either misreading the tape or mis-cutting the line as the plate is cut to length. Fourth, mistakes may be made at the assembly point by misunderstanding the layout code or missing the mark when nailing. Finally, when using wood studs, moisture causes the wood studs and components to twist within the wall after being nailed. This twisting cause nail pops in sheet rock and visible imperfections in wall finish, and results in substantial replacement costs. Thus, there clearly remains a need for an arrangement which permits the controlled placement, notching and cutting of components, such as studs, wall plates, shelving, lattices and furniture while minimizing potential mistakes and inaccuracies, and which minimizes warping and twisting of the studs and other components after construction. The notched joint fixes the axial movement of the members in the system and improves engineering design values.

There have been no known efforts to develop integrated automatic systems for the controlled modeling of framed structures, calculation of cutting and notching layout therefrom, and actual automatic cutting and/or notching of components and/or marking of components with a marking layout for subsequent cutting, notching or assembly.

At the front end, a few prior attempts have been made to develop application-specific computer modeling systems for generating 3D models of framed structures for construction purposes.

One exemplary program published by APDesign® is an architectural add-on for AutoCAD®. The APDesign program is parametric-building program that generates 3D models from 2D plans, working drawings, framing and quantifying information and site contours. The APDesign is arranged in six modules and a predefined database containing all building element descriptions, graphic data detail, prices and alternative codes, is shared by all the modules.

A Utility Module is the base module and provides the generic functions common to all the modules. The Utility Module assists in general design and the drafting process for 2D drawings, and makes provisions for 3D drafting.

An Architect Module functions to assist the architect in producing the 3D models rendered by the Utility Module.

A Quantity Module focuses on assembly, scheduling and pricing. It measures and collates the quantity of all building database elements contained in a 3D model created by the Utility and Architecture Modules or the Framing Modules.

A Framing Module automatically creates or inserts either timber or steel stud framing into walls, produces floor frame detail based on post, bearer and joist space, and provides a range of roof truss profiles. Once the frame data is created by its Wall Framing Stud function, a series of optional functions like breaks, corners, bracing, etc, can be invoked to complete the frame detailing.

A Survey Module produces detailed site information that may be combined with the 3D models produced by the Utility and Architect modules or the user to create a standalone site survey drawing. Site survey information such as property boundaries, spots levels and section data can be helpful in adding new items such as pipelines, pits and gullies in full 3D form.

A Terrain Module allows point data to be entered into an AutoCAD, drawing directly or either through it or the Survey Module, and be used to create a proportionally accurate graphic data set of any land surface.

While APDesign can improve the efficiency of architects, it suffers from a lack of detail, flexibility, and ease of use. Moreover, APDesign is purely for modeling. It has no practical ability to facilitate cutting and notching of framing components, nor is there an ability to directly transfer framing information onto framing components for subsequent controlled cutting, notching, and placement of intersecting components.

It would be greatly advantageous to provide an integrated process and device that begins with application specific modeling in the framing context, and which analyzes the model to quantify the cutting and notching information for accurately controlling the notching, cutting and/or marking of components such as studs, wall plates, openings, tees and corners, plus the floor and/or roof system layout, and associated components that may be located by reference to the layout such as plumbing, pipes, air conditioning, etc. Such an arrangement would eliminate the burden of working with blueprints, the errors associated therewith, and would minimize the twisting that the studs and the components may undergo after being placed in the wall panel. An integrated system would also accelerate production levels by automatically laying out, notching and cutting to length each component with minimal set-up time, even when the layout, notch locations and wall length vary infinitely and batch runs are not always practical.

Disclosure of Invention

The invention comprises an integrated system for modeling framed structures and for quantifying framing information, and including a method and device to automatically cut and notch framing components, and/or to directly transfer a marking layout onto framing components for subsequent controlled cutting, notching, and placement.

The process for modeling framed structures includes the steps of defining parametric models for a plurality of discrete wall panel components, defining parametric models for a plurality of wall panels, said wall panel models incorporating said discrete wall panel component models, defining an intersecting spatial relationship between the plurality of wall panels, tracking user progress to ensure completion, and compiling an overall parametric model of the plurality of wall panels, plurality of discrete components, and intersecting spatial relationship.

Once the model is completed, it is compiled to quantify design data, and the process may be extended to produce command signals which are fed to an apparatus to automatically move and notch the components in accordance with the design.

The above-described process can be embodied as a software program on a conventional computer, and the computer becomes an essential element of the apparatus. The apparatus further comprises a supporting frame, an automatic notching station carried by the supporting frame, the notching station including a notcher for notching said components, and a notching carriage for moving the notcher into cutting contact with the components. The apparatus also includes a component moving carriage supported by and positionable relative to the supporting frame for advancing components into a notching position relative to the notching station. The computer is connected to the automatic notching station and component moving carriage for coordinating and controlling operation thereof The computer sequentially advances the components into notching position relative to the notching station, moves the notcher into cutting contact with the components, and automatically notches the components in accordance with predetermined design considerations.

Rather than directly cutting and/or notching the components, both the process and apparatus may be modified to directly transfer a marking layout onto framing components for guiding cutting, notching and assembly thereof

BRIEF DESCRIPTION OF DRAWINGS

Some advantages of the disclosed invention will become apparent from a reading of the following description when read in conjunction with the accompanying drawings in which:

FIG. 5 is the Material Code Screen.

FIG. 12 shows the beam configuration window by which beams are added to the floor plan.

FIG. 18 is an opening cut list which lists all opening and opening types in the floor plan and list of components by component type with specifications necessary to build the openings.

FIG. 19 is an opening assembly list which lists all opening and opening types in the floor plan and a list of all components organized by opening.

FIG. 20 is a sheathing cut list which lists all sheathing sections to be cut for all wall panels.

FIG. 21 is a lumber take-off list which totals the materials costs for all components.

FIG. 22 is a lumber pricing chart which lists the lumber SKU numbers used in calculating the materials costs in the report of FIG. 22.

FIG. 23 is a total pricing report which includes the saw costs and fabrication costs for all components.

FIG. 29 is a side view of the dado-cut saws being moved downwardly to notch the wall plates.

FIG. 30 is a side view showing the dado-cut saws notching the wall plates.

BEST MODE(s) FOR CARRYING OUT THE INVENTION

Figure 1:
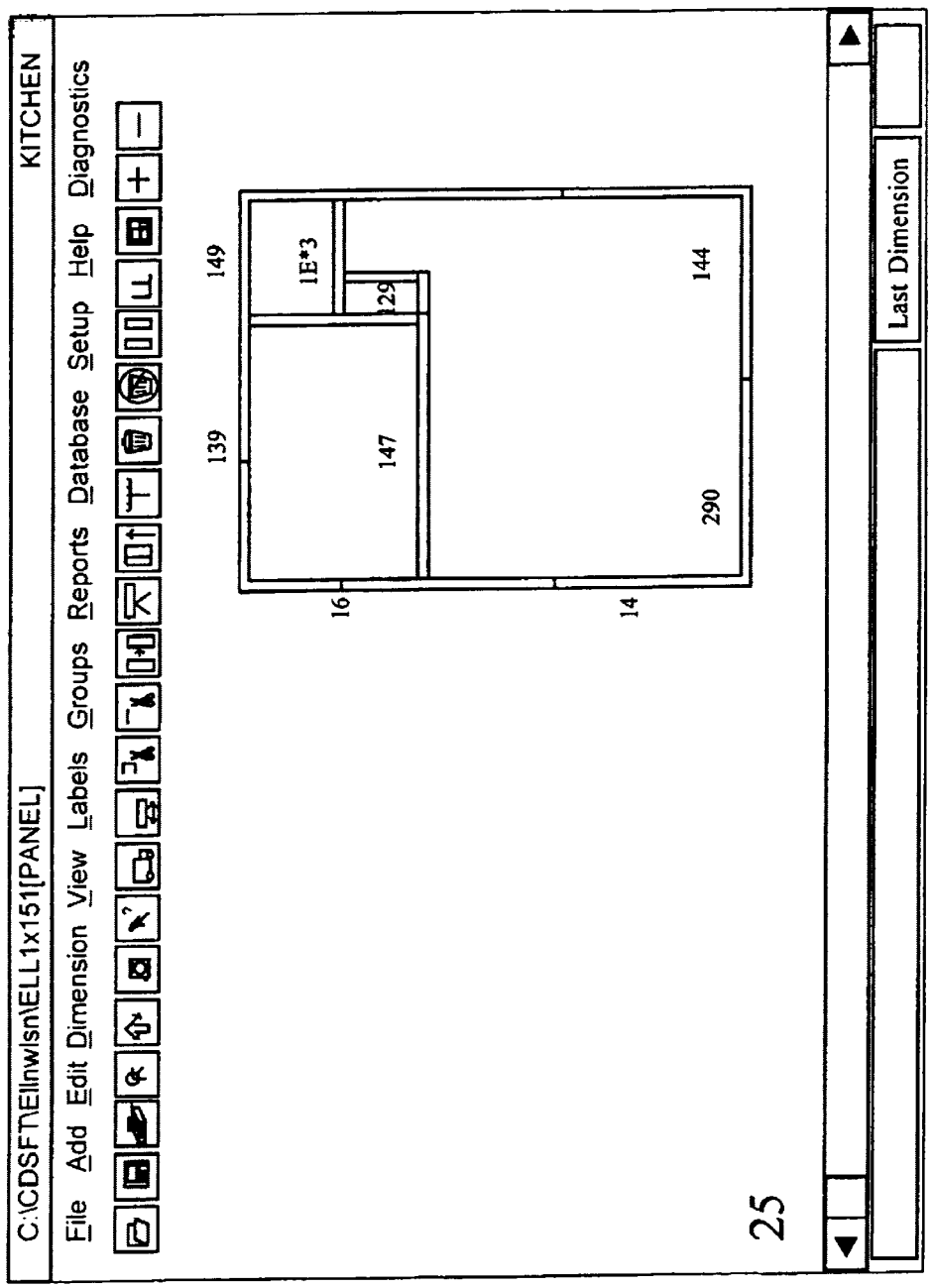
FIG. 1 is the Primary Editing window.

With reference to the drawings wherein like reference characters represent like components throughout the various views, there is depicted a framing system comprising a parametric-building computer program that allows a user to quickly and conveniently generate and analyze 3D models of framed structures. In addition, a marking layout is provided for quantifying the framing information, as well as a process to automatically cut and notch framing components, and/or to directly transfer framing information onto framing components for subsequent controlled cutting, notching, and placement of intersecting components.

The framing system of the present invention includes a software process which may be implemented on an existing computer workstation. The workstation can, for example, be a conventional personal computer and the CPU/Internal components can be those which are commonly integrated therein, e.g., a microprocessor with peripheral chipset mounted on an appropriate motherboard. More or less powerful computer systems can be used, but it is suggested that minimum system performance is realized with a 66 Mhz CPU processor with 16 Mb of RAM. The system may be easily ported to run on a MacIntosh operating system and minimum system requirements are comparable to the above-described PC-based requirements. The user interface includes a conventional monitor attached via a serial port to the CPU/Internal Components. It is suggested that best video results are gained with an SVGA 17" monitor with 1024×767 pixel resolution. The user input is through a conventional keyboard and a pointing device such as a mouse. Approximately 20 Mb of disk storage is required, and this may be provided in the form of a commercially available disk drive attached via known IDE or SCSI interface to the CPU. The architecture must also include certain resident firmware including an operating system such as Windows 95® by Microsoft, appropriate drivers for all internal hardware components including the above-described devices. The foregoing description of the architecture will be understood by one skilled in the art as merely an example of one system which could be used to implement the various embodiments of the computer program of the present invention described in detail below and, and that various other configurations and devices could also be used.

Once installed and initiated, the computer program of the present invention guides a user quickly through a series of steps in which all necessary components of a framed structure are defined, assembled, compiled and analyzed, including wall panels, tees and intersections, openings, etc. During each step in the process the user is presented with simple graphical interfaces that provide all of the software tools necessary to define and assemble the components of the framed structure. A primary advantage of the invention lies in its intuitive organization and flow, e.g., all necessary components, sub-components, sub-sub-components, etc. are defined by the user and stored in a library (the library being arranged in layers corresponding to the level of detail of the component). Then, the pre-defined components may be added to the floor plan as desired. Finally, the floor plan may be compiled and assimilated into a complete three-dimensional model.

The program initializes to the Primary Editing window of FIG. 1 which is a graphical user interface that provides a windows-based text menu at the top and a corresponding series of graphical icons that serve as means for navigating the program. By clicking on the text menu at FILE, the user may Open an existing floor plan, Save a floor plan (if currently open), Create a new floor plan, Delete a floor plan, Export a floor plan (if currently open) to a variety of other file formats for use in other programs, or Exit the program. The underlying icons provide shortcuts to certain of these and other tasks as described below. If the user chooses FILE>CREATE to create a new floor plan, the user may then click on>EXPRESS to initiate a new floor plan expediently. The user is then prompted to enter the following input:

a. Floor plan Name (up to 8 character alpha/numeric).
b. Value of the Horizontal Dimension of the Total Horizontal Plan Width.
c. Value of the Vertical Dimension of the Total Vertical Plan Height
d. "Material Code" Input for Panel Lumber for Exterior Wall Thickness. The program assigns material codes to designate component material properties, and the user must select or define the material properties for each code (as will be described). Once the forgoing data is entered and a name chosen by the user, e.g., "bldg.", a file by that name is created and is assigned a *.flp extension to designate that it is a floor plan.

Figure 2:
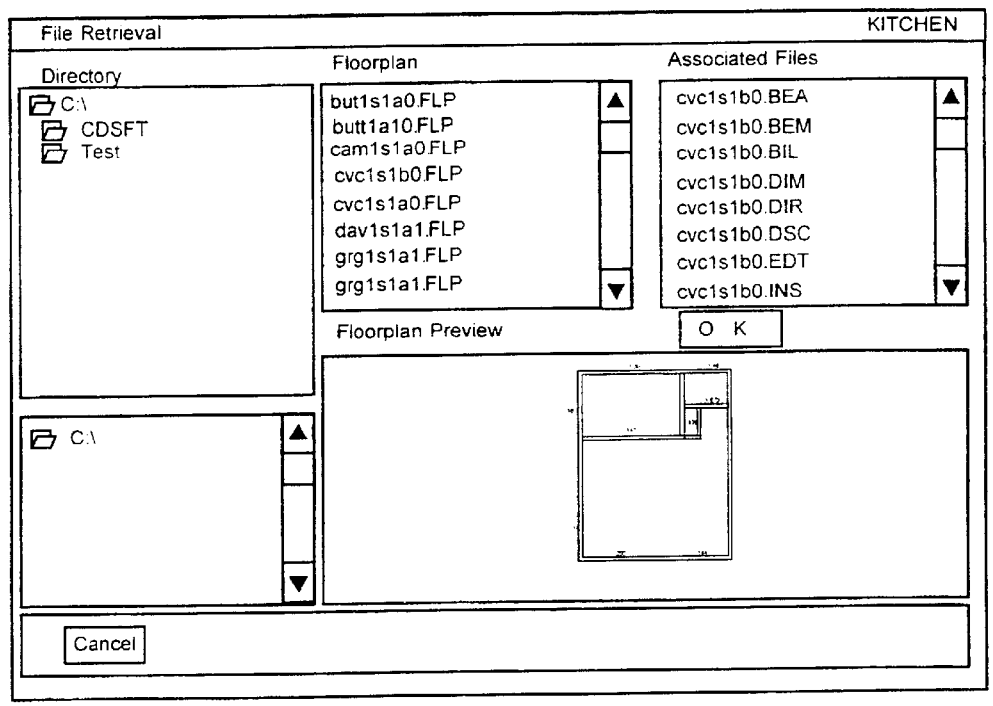
FIG. 2 is the File Retrieval window which opens an existing floorplan.

If, on the other hand, the user chooses to Open an existing floor plan, the File Retrieval window of FIG. 2 appears. This window is segregated into four separate sub-windows including Directory, Floor plan, Associated Files and Floor plan Preview sub-windows. The Directory sub-window displays the computer folders and sub-folders in a conventional manner and allows the user to navigate the attached storage media to find the location of a pre-defined floor plan. The Floor plan sub-window displays all floor plans with the *.flp extension in a designated folder. The Associated Files sub-window shows all object files which have been associated with a selected floor plan. Finally, the Floor plan Preview sub-window gives a graphical preview of a selected floor plan. Once the user has located a desired floor plan to open, he clicks on the "OK" button to open that floor plan.

Once a floor plan is created or opened, the program returns to the Primary Editing window of FIG. 1, and the user may navigate this window at will in order to generate a completed floor plan. The user must complete a number of "tasks" for completion of the floor plan, and each task involves one or more user "steps". Once the appropriate steps are taken to complete the prerequisite tasks, the user proceeds to the remaining tasks and is able to complete a Build routine (to be described) that assimilates all previously input data and builds the actual three-dimensional floor plan. If the user attempts to run the Build routine prematurely before the prerequisite tasks are completed, a concise introductory checklist of tasks is displayed to inform the user of the prerequisite unfinished tasks (which are necessary to define all wall panels associated with a floor plan, and all detailed components associated with all wall panels in the floor plan).

Figure 3:
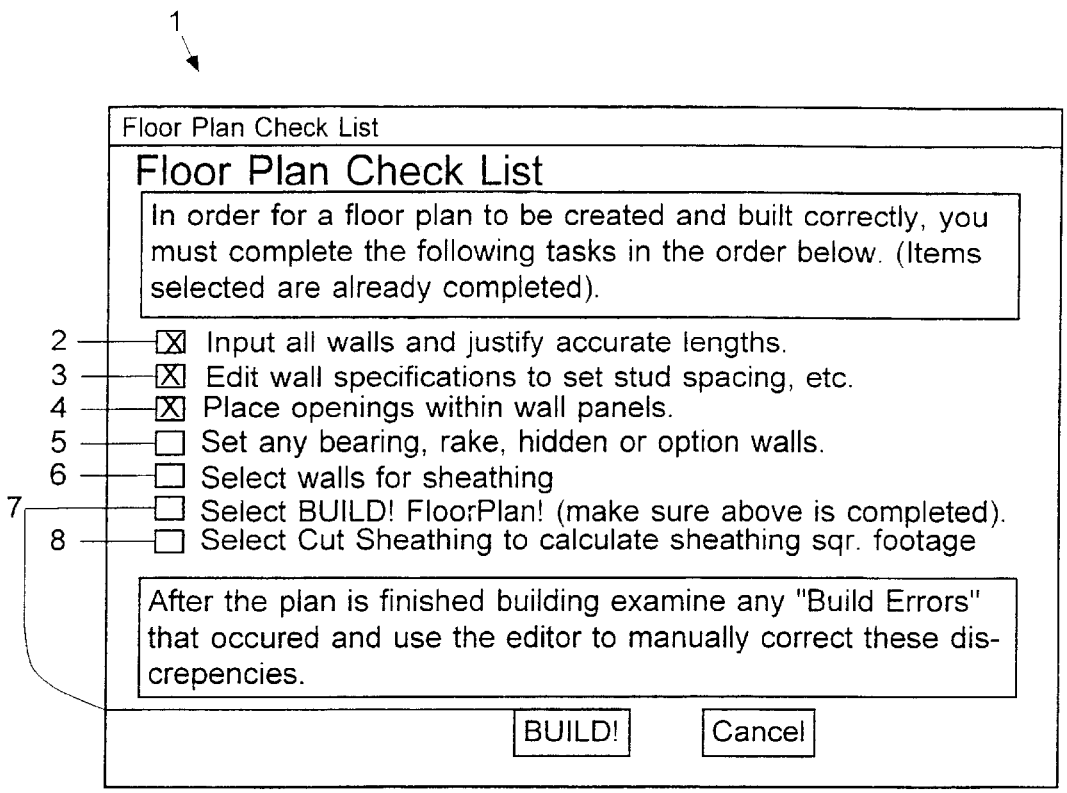
FIG. 3 shows a visual display 1 for the checklist of seven major substantive tasks 2–8 which the user must complete in order to generate a proper floor plan.

FIG. 3 shows a visual display 1 for the checklist of tasks. Again, the program generally will not present this particular visual display window 1 until the user runs the Build routine (described below). However, the checklist serves as a good point of reference in describing the overall program flow, and the program is herein described with reference to the tasks as they appear in visual display 1.

The checklist includes seven major substantive tasks 2–8 which the user must complete in order to generate a proper floor plan.

The first task for completion 2 is to input all discrete wall panels included in the floor plan, and to justify their accurate lengths.

The second task for completion 3 is to edit the wall panel specifications (set in step 2 above) in order to set stud spacing and other construction details.

The third task for completion 4 is to place any necessary openings within the wall panels (the panels having been defined in steps 2 and 3 above).

The fourth task for completion 5 is to set any Bearing, Rake, Hidden or Option Walls (set in step 2 above) as will be further described.

The fifth task for completion 6 is to select the walls that are to be sheathed.

The sixth task for completion 7 is to run a Build routine that assimilates all previously input data and builds the actual three-dimensional Floor Plan.

The seventh task for completion 8 is to Cut the Sheathing in order to calculate sheathing square footage (based on the walls selected to be sheathed in the fifth task 6).

Throughout all of the above-described tasks, the computer program of the present invention tracks the progress of the user. When the user runs the Build routine 8 (sixth task for completion 7), successful completion of each task is designated with a check mark in the appropriate check box 2–8 in visual display window 1.

Following execution of all of the above-required tasks 2–8, the floor plan is complete and can be printed, analyzed or edited at will. A number of useful reports can be generated to assist in ordering or shipping lumber.

In further accord with the present invention, the floor plan may be translated into a marking layout for quantifying the framing information. This information can be transferred automatically and directly onto framing components to guide cutting, notching and/or placement of associated members. In addition, the information can be used directly to drive an automated cutting/notching machine in order to cut and notch the stud locations for the wall panels.

While tasks 2–8 must all be completed, it should be understood that they need not be completed in the sequence shown. The user is free to navigate the program at will, so long as the prerequisite tasks for the Build routine 8 are completed. It is also noteworthy that components must be defined and stored in a library prior to placement in the floor plan. Some users may choose to define and/or refine all existing components initially, while others may prefer to define components piecemeal prior to adding them to the floor plan. In practical terms, a library of pre-defined components will be supplied with the program. Hence, the addition/editing of components will be described throughout as an optional step prior to adding the particular component type to the floor plan.

Completion of each major task 2–8 shown in the visual display of FIG. 3 requires that the user perform a series of incremental steps to ensure that all floor plan information is properly entered for that task. Once the checklist of tasks is completed past the Select Walls for Sheathing Task 6, the program will allow the user to proceed to the Build! Stage 7 wherein the actual three-dimensional floor plan model is compiled. Short of this point the user is forced to Cancel out of the introductory checklist of tasks shown in the visual display 1 of FIG. 3. Upon pressing the "Cancel" button, the user is returned to the Primary Editing window of FIG. 1 and may navigate this window at will to further complete any unfinished prerequisite tasks.

All steps necessary to complete the checklist of tasks will now be described with reference to FIG. 4, which shows a detailed flow-chart of the user steps necessary for completion. Other Figures will be referenced as necessary to describe the graphical interface tools by which the user navigates and completes the program steps.

Referring back to the Primary Editing Window of FIG. 1, this is a graphical user interface which allows for convenient click-and-drag definition of any and all components of the floor plan. The floor plan or component file which is presently being edited is shown at the top title bar along with the file path. To the extent that it has been defined, a graphical representation of the floor plan being edited is shown in a viewer window. The windows-based text menu at the top and corresponding series of graphical icons provide the user with a navigable means for accomplishing the entire underlying sequence of steps necessary to complete the entire checklist of tasks 1. While it should be understood that various labels may be assigned to the menu items and that different graphical icons may be used, the illustrated icons allow the user to perform the following (respectively, from left to right):

OPEN: opens a floor plan file.

SAVE: saves a floor plan file

PRINT: prints a floor plan file

ZOOM: enlarges floor plan being edited is shown in a viewer window.

PAN: allows the user to click at a point in the viewer window and viewer becomes centered there DIMENSION: the user may click on DIMENSION and point to two edges between which a dimension is desired. The dimension is automatically calculated and displayed.

ID: the user can click on ID to check the various parts of the plan. Another click on a wall and an ID Box appears in the upper left corner displaying the following information. Name: the item designation. Length: overall length from end to end in feet and inches. Width: the wall width in inches. Base: the bottom plate elevation of the item. Depth: the actual height of the item in inches. Top: the top plate elevation in inches. Record: the internal record number used for identification in the program (as will be described).

MOVE: When the user click on the MOVE icon the user will be prompted to click on an object and drag it to its new location.

DIMENSION: When the user click on the DIMENSION BUTTON the user will be asked to click on the first object from which to measure the dimension, and then to click on the next object to complete the dimension. A temporary dimension line will appear between the selected objects and the dimension will be calculated and shown.

TRIM OBJECT: this prompts the user to "Select The Object You Wish To Trim." The user points and clicks on the object and it highlights in yellow. Next, the user is prompted to "Select The Edge You Wish To Trim It To". When the user points and clicks on an edge the object that was highlighted in yellow will again change color (e.g., to maroon) and the chose edge will be highlighted in yellow. Both object and edge will turn to black in a few seconds and the object will have been trimmed to the edge. This allows the user to input objects and then join them later to insure that edges are touching.

TRIM EDGE: this tool is primarily used for trimming angle walls to their final location. Once the user has established two walls at an angle, he can trim the angle wall to the receiving wall with TRIM EDGE.

COPY: When the user clicks on the COPY BUTTON the user will be prompted to click on the item the user wish to duplicate. He clicks on that item and immediately the component is duplicated. Now the user can click on Move to move that object wherever the user wishes.

ELEVATION: this will prompt the user to "Point To Item To Set Base Elevation". When they click on an item it will highlight yellow and a Current Elevation Box will appear showing the current base plate elevation. The user enters the new elevation, in inches, and clicks OK. The bottom plate will be adjusted to the new elevation. Now the user can go back to the Depth Button right above the Elevation Button and enter the new depth of the panel. At this point the panel will be fully adjusted to the users requirements.

DEPTH: this allows the user to change the height of a wall easily. They are prompted to "Point To Item To Set Depth" The user clicks on an item and it will turn yellow. At the same time the Current Depth Box will appear. If the user find that the overall height in inches should be changed, simply type in the new depth and click OK. If the depth is correct just click CANCEL and go to the next item.

DELETE: When the user click on the DELETE BUTTON the object highlighted in black is registered for deletion. An information box appears and the user must confirm deletion of the selected component.

UNDELETE: undeletes a deleted component.

SAVE: When the user click on the SAVE BUTTON an information box will appear, and prompts the user to confirm whether to save his edits.

HIDE/EXPOSE: hides or exposes hidden components (to be described).

BUILD: initiates the Build! Routine as will be described.

BUILD ERRORS: displays Build Routine Errors (as will be described).

FIT: When the user click on the FIT BUTTON it will automatically reposition the wall panel in the center of the box, and will unzoom the preview screen.

The detailed sequence of the program will now be described with reference to the above-described graphical icons and menu items. FIGS. 4a–4f show the incremental steps taken by a user in the course of completing tasks 2–8 of FIG. 3 (with dotted lines indicating the association between user steps and tasks 2–8).

The first task for completion 2 is to define the outer walls in the floor plan. If the user has opened an existing file, the existing walls will be shown in the viewer window. If the user has created a new floor plan, the outer walls are automatically generated and shown in accordance with the Value of the Horizontal Dimension of the Total Horizontal Plan Width, the Value of the Vertical Dimension of the Total Vertical Plan Height, and the Material Code Input all as specified initially by the user. Otherwise, the outer walls must be added, defined and/or edited as desired. To accomplish this, the user adds walls at step 30 by selecting ADD from the Primary Editing Screen of FIG. 1, then WALL. The user is given the option to add the wall BY SKETCH or BY WORKLINES. In either case, the user must also select or define the material codes for the wall to be added in step 40 (as will be described).

Figure 5:
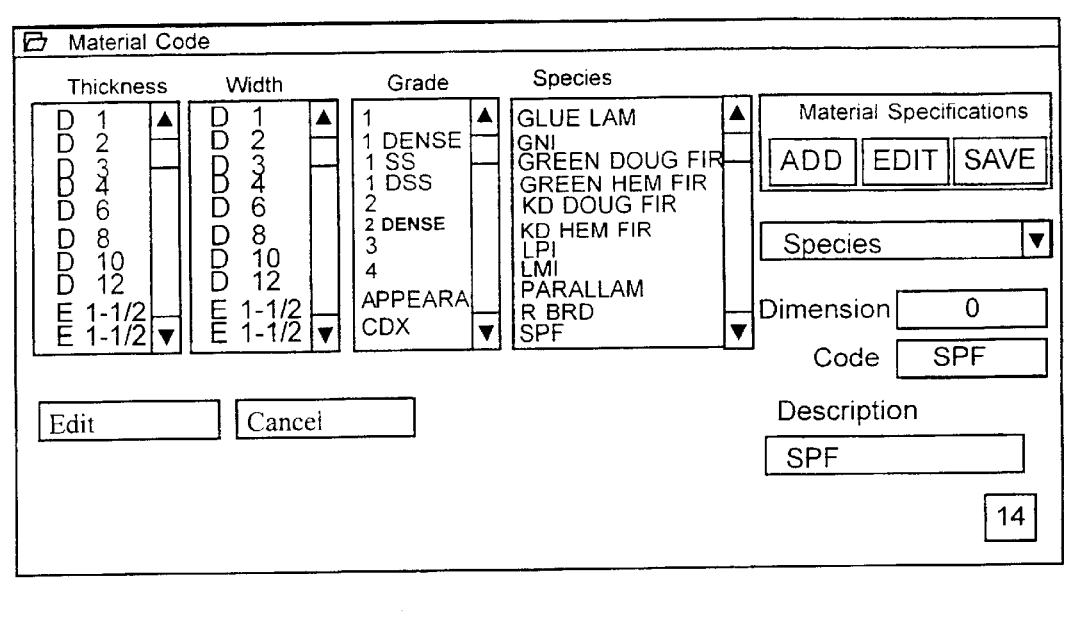

To add BY SKETCHI, the Material Code Screen of FIG. 5 appears and the user may verify or change the wall size and species. Most material types and grades are pre-defined and stored in a material library. However, these can be edited and new types and grades can be defined via the Material Code Editor of FIG. 5. The user must set material properties at step 40 for each wall such as grade and species of all parts, stud spacing, stud plys, wall sheathing, bracing, etc. For each wall component, records are defined for each wall property and the records are stored in an object layer ".wac" that is associated with the particular component being edited. The material properties that can be defined include "Thickness", "Width", "Grade", and material "Species". New material specifications can be defined by the user by depressing the ADD button at right, and existing material specifications can be edited by depressing the EDIT button. Once the material code is set, the user clicks OK and the Primary Editing Screen of FIG. 1 will return with a DONE Box in the upper left hand comer. The user is now able to sketch walls in by click and drag in the viewer window. Specifically, the user selects the start position of the wall by clicking at that position on the viewer window. A color-coded (yellow) hash mark will appear, and the user drags the hash mark and releases to select the end position of the wall. The sketched wall appears in color (cyan) to indicate it has been added. When the user finishes sketching he clicks Done (at this time and throughout it is a good idea to save the work). The wall turns to black and the routine will terminate. All intended walls may be added in this manner.

Figure 6:
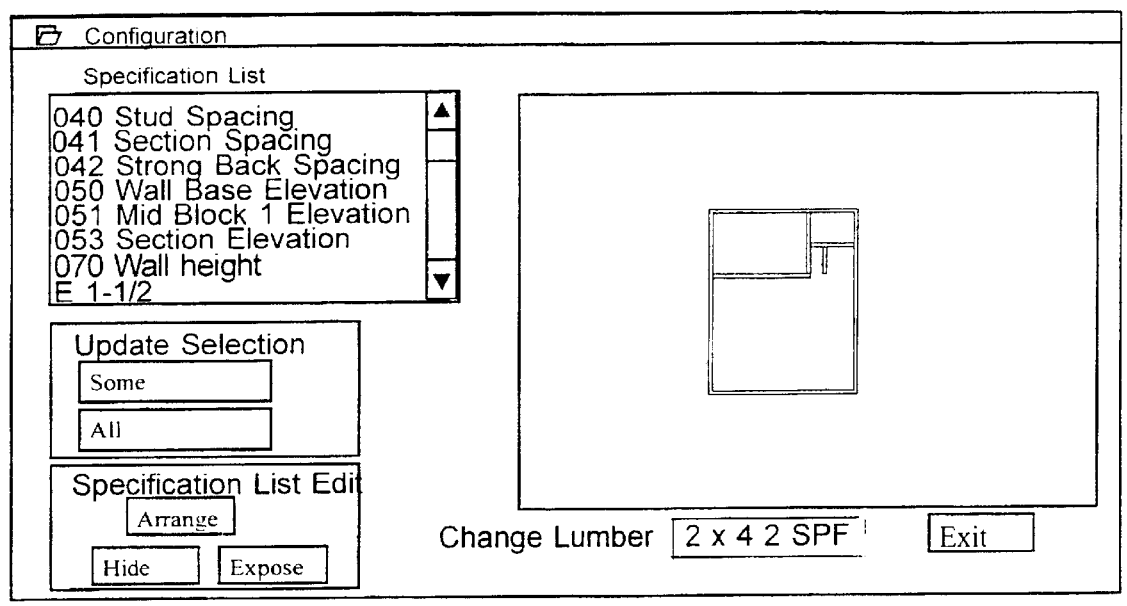
FIG. 6 is the Configuration Window.

Alternatively, the user may add walls BY WORKLINES (click on WALL in the Primary Editing Screen of FIG. 1 and then>BY WORKLINES). Again, the Material Code Screen of FIG. 6 appears and the user is prompted to verify or change the wall size and species as per above. Upon completion, the user clicks OK and the Primary Editing Screen of FIG. 1 returns with a DONE Box in the upper left hand corner. In addition, a matrix of evenly-spaced gridlines or "worklines" is superposed on the Editing Screen. The user is now able to input the specified walls by pointing and clicking on the worklines appearing on the screen. When the user is finished adding walls he clicks Done and the routine terminates. All intended walls may be added in this manner.

Once all walls are in place the user may add dimension strings to the floor plan (FIG. 4 step 50). Dimensions strings are shown in the viewer window as point-to-point lines and the actual length of each string is automatically calculated and shown proximate the string. To accomplish this the user goes to the DIMENSION MENU and is prompted with the following options for adding dimension lines.

ADD STRING: This option will allow the user to add a dimension line by pointing and clicking on walls to establish the beginning and ending points of dimension lines. When a dimension line has been established it is shown in color (maroon). The actual dimension is shown midway along the dimension line.

MOVE: when a dimension line has been established it may be moved by clicking and dragging the line, then clicking on the destination.

ON CENTER: When the user clicks ON CENTER he is prompted to "Select The Object You Wish To Apply An On Center Dimension". The user then selects a point on the preview window and a yellow circle will appear indicating the start point of a dimension string. The user is then prompted to "Select The Place Where You Want The Label Placed". The user points to a position and is prompted to enter up to a 10-character dimension label. This is done and the user clicks OK. The label will appears in color.

DELETE: may be used to delete a dimension string.

AUTO: This menu tool allows the user to quickly dimension a plan. Once selected the user is prompted to then select between HORIZONTAL or VERTICAL options. Should the user choose HORIZONTAL, he may point to a spot on the preview window and horizontal dimension strings will automatically be created between all vertical walls. Should the user choose VERTICAL, he may point to a spot on the preview window and vertical dimension strings will automatically be created between all horizontal walls. In this manner the entire floor plan can be specked out with exact dimensions.

Figure 9:
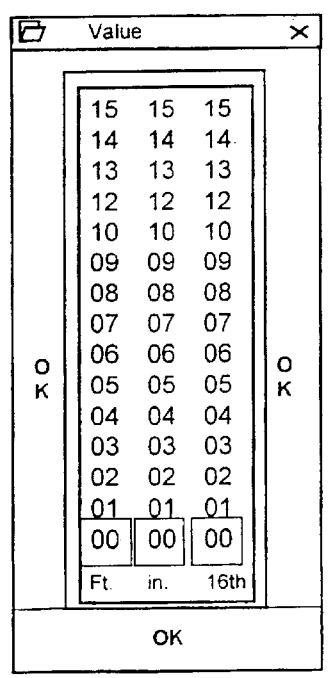
FIG. 9 is the Value (entry) Box

The worklines also serve as a tool for changing component dimensions. Once a permanent dimension line has been added by the above commands, the user may select FORCE and manually enter a specific dimension. The user then clicks on the dimension line to be forced. The Value Box of FIG. 9 will appear and the user may enter a specific dimension and click OK. All affected walls and dimensions will be highlighted, and the user may then point and click to deselect any affected parts. Once the user has selected the dimension lines and components to change he clicks DONE. The dimension lines change to the specified dimensions and the walls automatically are moved to their new locations. The user continues as per the above until all walls have been appropriately defined and dimensioned.

Referring back to the introductory checklist of tasks to be completed by the user in FIG. 3, the second major substantive task 3 that the user must complete in order to generate a proper floor plan is to edit the walls defined in task 2 above in order to set stud spacing and other structural details. This is shown as step 60 in FIG. 4b. To accomplish this the user selects EDIT from the menu and>WALL CONFIGURATION. This causes the "Configuration" Box of FIG. 6 to appear, and the user sees the floor plan on the right (in maroon) together with a SPECIFICATION LIST pull down menu on the left. The user clicks on the arrow to pull the SPECIFICATION LIST menu down, and then clicks on the feature they wish to edit. Exemplary specifications include Stud Spacing, Section Spacing Strong back Spacing, Wall Base Elevation, Mid-Block 1 Elevation, Mid-Block 2 Elevation, Section Elevation, and Wall Height. All of these specifications are pre-defined and have an assigned lumber type. The existing specifications are shown directly below, and assigned lumber type below the preview window. However, if the user wishes to change the lumber specification, they may enter new specifications and/or click on the CHANGE LUMBER button and choose a new configuration. Once the desired specifications are set, the user goes to the UPDATE SELECTION Box and chooses SOME or ALL. If they choose SOME, they must point and click at the walls they want changed in the preview window. If they want all the walls changed, they click ALL. The selected walls will change color (e.g., from maroon to yellow) indicating clearly what is being changed. To verify a change, the user can go back to the SPECIFICATION LIST, click on the item, and see the new specifications in the EXISTING CONFIGURATION List below. If there was more than one change, the items changed are shown in different colors to clearly distinguish. The EXISTING CONFIGURATION list may vary depending on the item selected in the SPECIFICATION LIST. For example, when making changes to specifications which require a height designation, the user is presented with a new field called ENTER NEW VALUE. They must then type the new height requirement and choose ALL or SOME. Again, the change will be made and verified by going back to the SPECIFICATION LIST and clicking on that item. All stud spacing and other structural details may be set in this manner.

Figure 7:
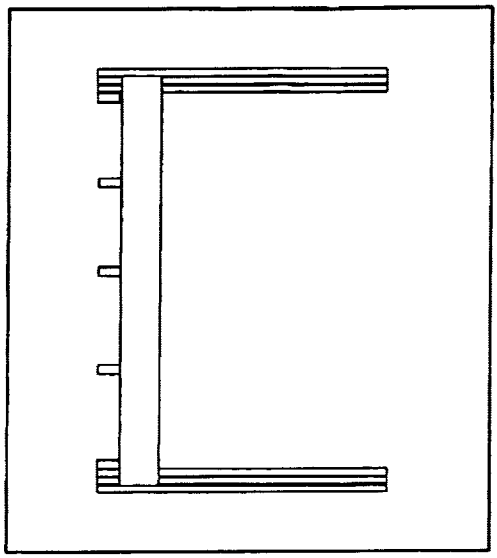
FIG. 7 is the Component Editor Window.

Referring back to the introductory checklist of tasks to be completed by the user in FIG. 3, the third major substantive task 4 that the user must complete in order to generate a proper floor plan is to place any necessary openings within the floor plan. The openings mark the locations in the floor plan for windows, doors and other components. Each opening can be selected from an existing library, or imported from a foreign library. Of course, a predefined library of openings must exist prior to adding them to a floor plan, and a library will be supplied with the program. Nevertheless, the user may also define an opening by clicking EDIT and then>COMPONENT. This brings up the Component Editor window of FIG. 7 and described below. The Component Editor window of FIG. 7 can be called upon to edit an existing library opening or it can be used to define a new opening. Either way, the subject opening is depicted in a preview window at right. The framing components used in the subject opening are denoted to the left by a series of check boxes. Where applicable, data entry boxes are provided to the immediate right to designate the "Plys" of lumber used for the opening, the lumber material, and the length of the component, respectively. All of these component parameters can be input and/or changed at will by the user. An Opening Specification area indicates the name of the wall panel shown in the preview window, as well as the library (e.g., folder or sub-directory) in which it is stored, and all of the general dimensions for the subject opening. The opening material may be edited by the "Change Lumber" button shown at right, the selected material being shown directly beneath.

Once the user has defined his library of openings, he can begin to enter the openings into the floor plan. This task 4 is represented as three successive steps 70, 80 and 90 in the flow diagram of FIG. 4c. In the first step 70, the user specifies the rough openings that mark the locations in the floor plan for windows and doors. In the second step 80, the user specifies the rough opening locations in the floor plan for tubs, toilets, vent pipes, etc. In the third step 90, the user specifies the rough opening locations in the floor plan for recessed medicine cabinets, electrical panels, and the like.

All information entered in step 70 to demarcate rough openings for windows and doors is posted to the database in a layer of separate files with the *.opn extension.

All information entered in step 80 to demarcate rough opening locations in the floor plan for tubs, toilets, vent pipes, etc. is posted to the database in a layer of separate files with the *.hol extension.

All information entered in step 90 to demarcate rough opening locations in the floor plan for recessed medicine cabinets, electrical panels, and the like is posted to the database in a layer of separate files with the *.opn extension.

To add any of the above-described openings from the Primary Editing Screen of FIG. 1 to the open floor plan, the user selects from the menu ADD and then 22 OPENING. The user is then given options on how to add the opening, including QUICK, DIMENSION TO CENTER, DIMENSION TO EDGE, or BETWEEN WALLS.

Figure 8:
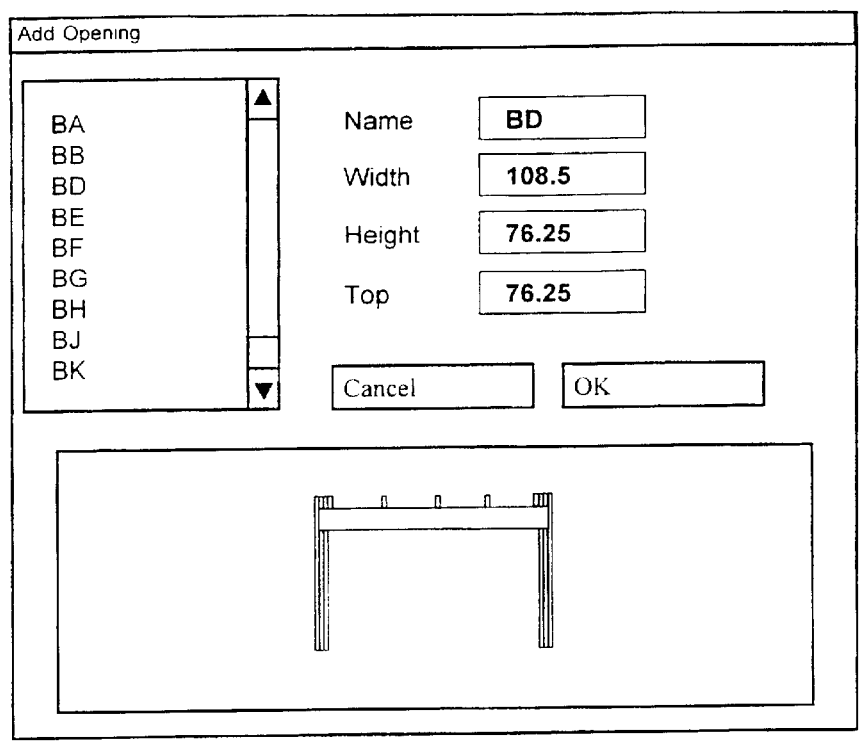
FIG. 8 is the Add Opening Box

When the user clicks on QUICK the Add Opening Box of FIG. 8 appears and each pre-defined opening is designated by a label such as "BD", as shown in the pulldown menu (top left). Each labeled opening is predefined by width, height, and top dimensions as shown at top right. A lower preview window is provided to show the structural appearance of the selected rough opening. The user simply clicks on the opening they wish to place into the floor plan. This causes the OK button to highlight, and picture of the component appears in the preview window along with all of the component information shown to the right. If this is the correct the user clicks OK.

When the user has clicked OK they are returned to the Primary Editing Screen of FIG. and may point to where they want the component. This QUICK selection is primarily for a cursory plan and is not intended for final plans.

When the user clicks on DIMENSION TO CENTER the Add Opening Box of FIG. 8 appears and selection proceeds as above. However, when they are returned to the Primary Editing Screen of FIG. 1 they are prompted to "Select Wall Receiving Component". The user points to the wall on the floor plan where they want the component located. Next, the user is prompted to "Select a Workline Or Reference Point To Start". They click on the wall or workline from which the centerline dimension will be strung. The Value Box of FIG. 9 appears and the user enters the distance to the center of the opening and clicks OK. The opening is automatically located in the wall and all corresponding dimensions are automatically calculated.

When the user clicks on DIMENSION TO EDGE the Add Opening Box of FIG. 8 appears and selection proceeds as above. Again, when they are returned to the Primary Editing Screen of FIG. 1 they are prompted to "Select Wall Receiving Component". The user points to the wall on the floor plan where they want the component located. Next, the user is prompted to "Select a Workline Or Reference Point To Start" from which the edge dimension will be strung. The Value Box of FIG. 9 appears and the user enters the distance to the edge of the opening and clicks OK. The opening is automatically located in the wall and all corresponding dimensions are automatically calculated.

When the user clicks on BETWEEN WALLS the Add Opening Box of FIG. 8 appears and selection proceeds as above. However, after the user "Selects Wall Receiving Component" by point and clicking on the wall where the opening is to be located, they are prompted to "Select First Wall To Place Component Between". The user point and clicks on the first wall, and a colored hash mark will appear. Then the user is prompted to "Select Second Wall To Place Component Between". They point and click on the second wall and the opening will be automatically located immediately in the wall between the two walls which were selected.

The selection process continues until all desired openings have been added into the Primary Editing Screen of FIG. 1 and appear on the open floor plan.

Figure 4A:
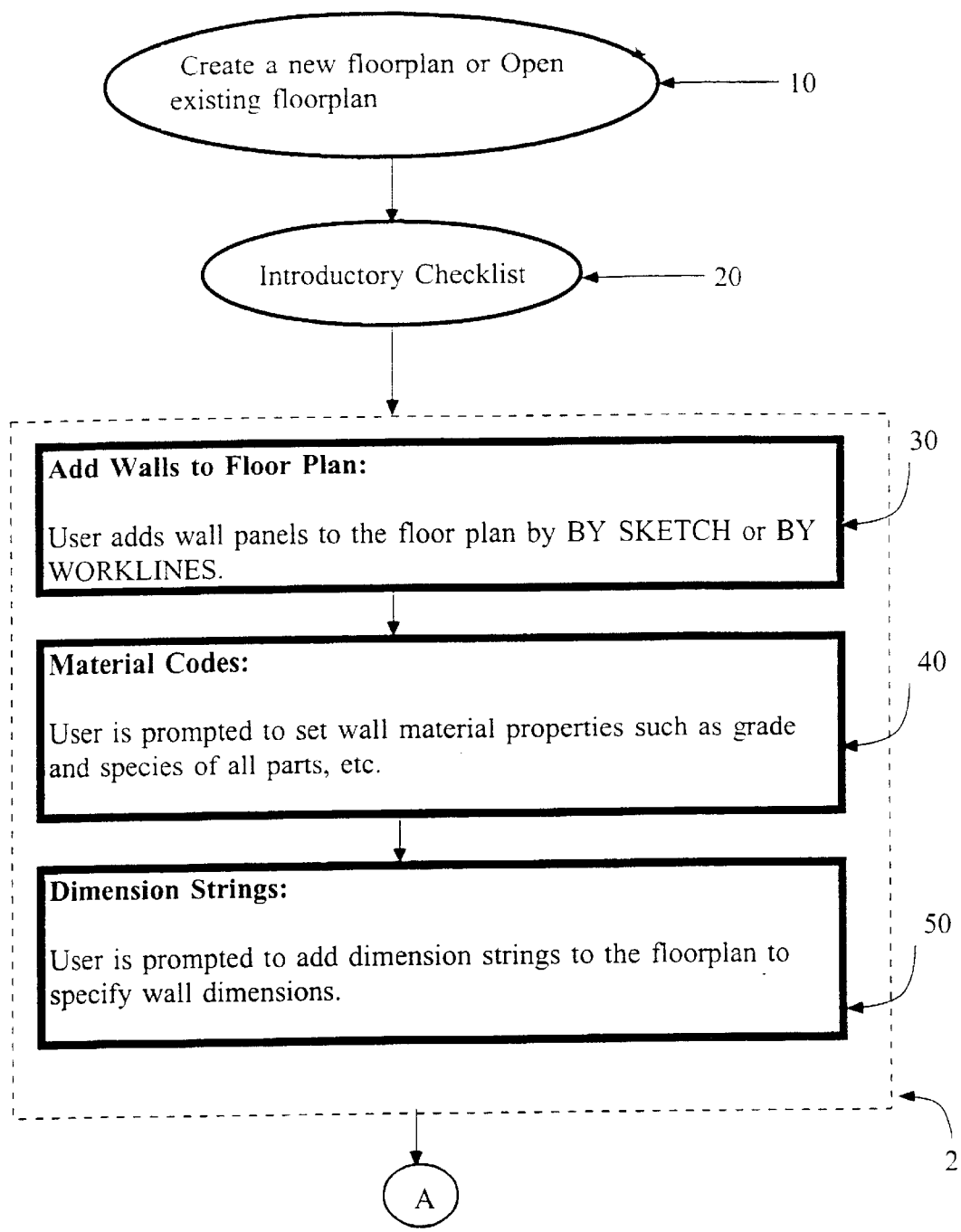
FIGS. 4a through 4f are a detailed flow-chart of the user steps necessary for completion.
Figure 4B:
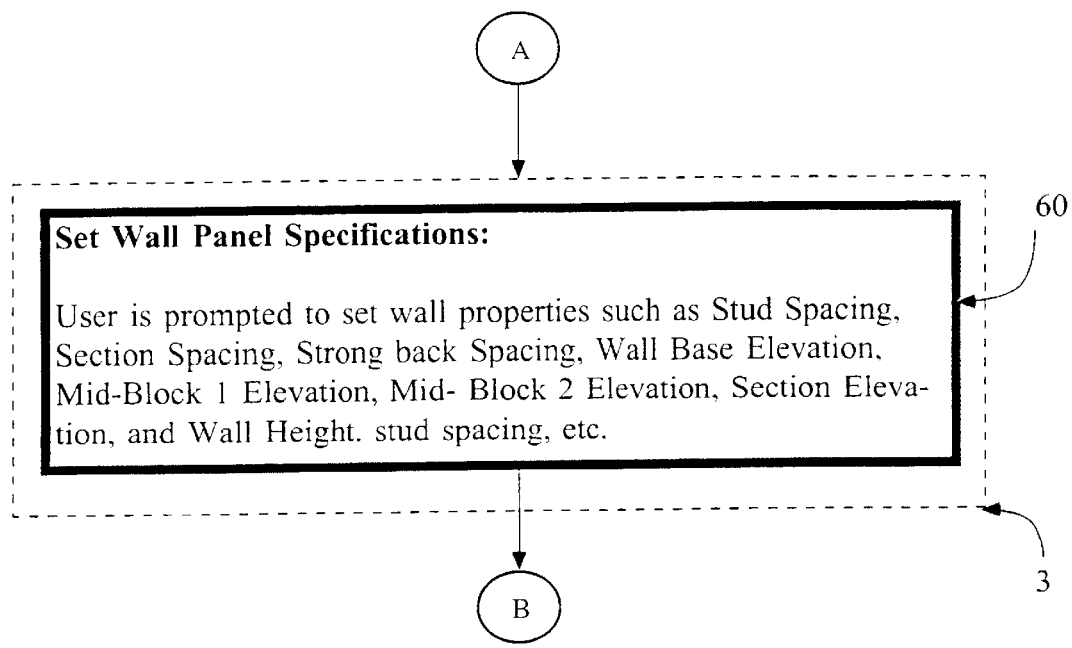
Figure 4C:
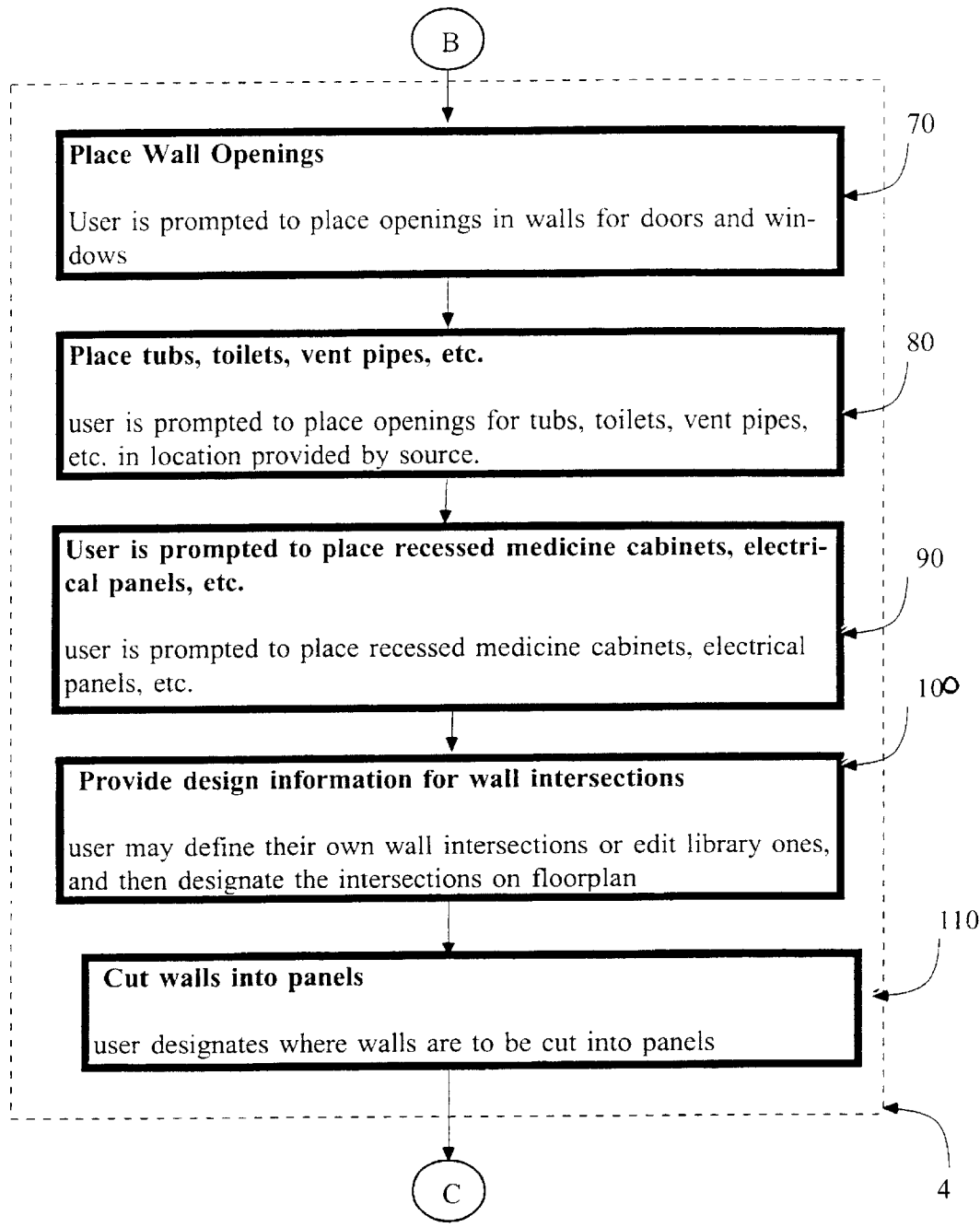
Figure 4D:
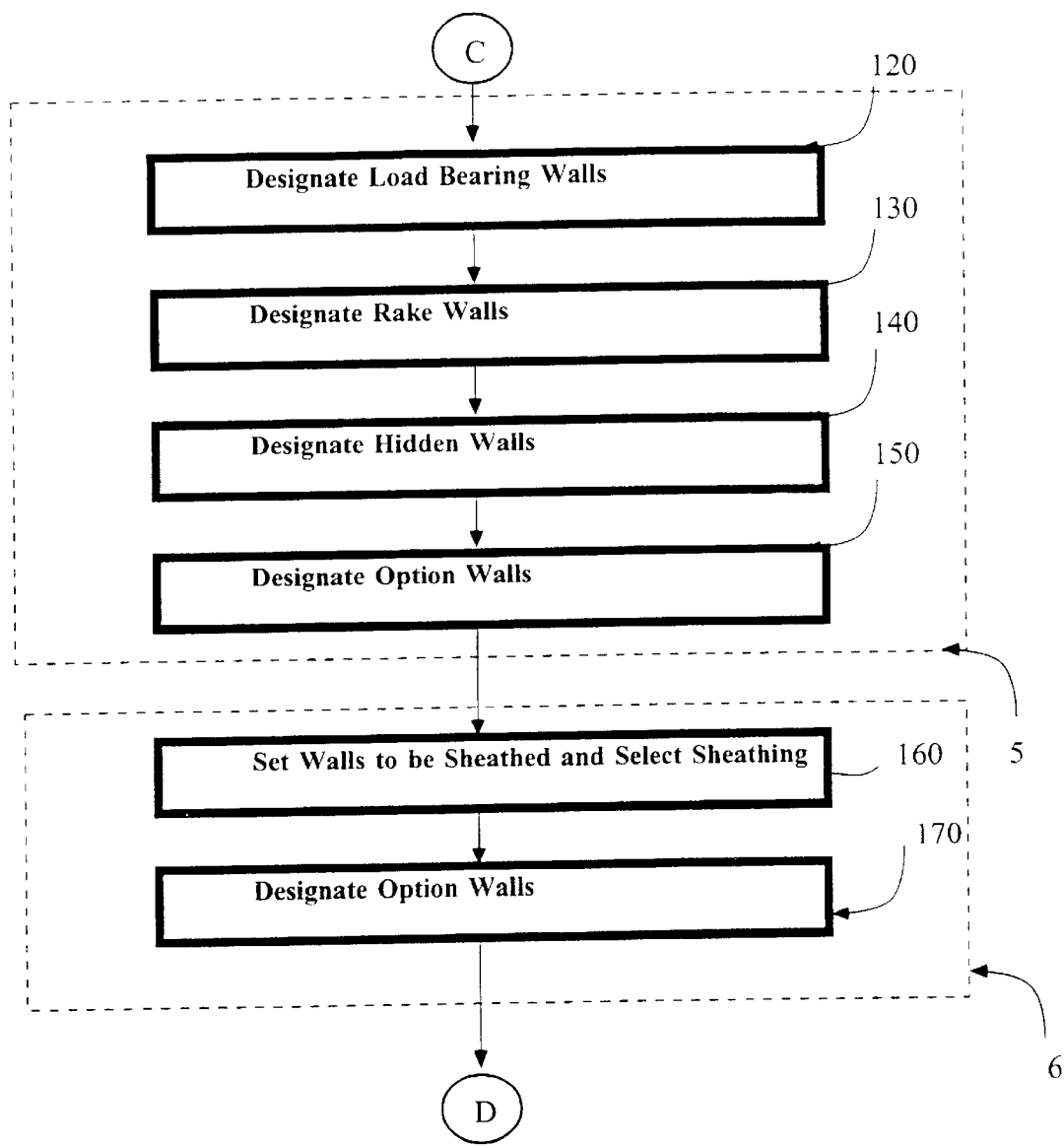
Figure 10:
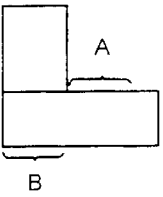
FIG. 10 is the Consumed Space Criteria Setup by which wall intersection criteria are set.

As adjoining walls are entered the user must also provide design information for wall intersections (FIG. 4c, step 100). Again, a predefined library of intersection types (or "cases") must exist prior to adding them to the floor plan, and a library will be supplied with the program. Nevertheless, the user may define their own wall intersections or edit library ones by clicking SETUP an then>INTERSECTION. This calls up the Consumed Space Criteria setup of FIG. 10, which is the user interface by which wall intersection criteria are set. There may be different types of pre-defined intersections, and the preview window shows Intersection Criteria Case #1. All other pre-defined cases may be previewed by scrolling the scroll bar underneath. The intersection of two subject walls are shown in a preview window to the left with significant dimensional parameters labeled thereon. The labels for Case #1 include "minimum right nailing surface A", maximum/minimum width B, filler C, left component D, and right component E. All significant dimensional criteria are shown in the combination of pulldown menus and check and entry boxes at right, including minimum right nailing surface A, maximum and minimum width B, filler C type, horizontal orientation of the filler C, left component type, horizontal orientation of the left component type, right component type, and horizontal orientation of the left component type. Should the user decide to edit any of these parameters he may click on EDIT PREFERENCES and then enter the parameter he wishes to change. After the user has made the appropriate changes he clicks SAVE INFO and EXIT. Specifically, Alternately, the user can click and drag a selected criteria of the intersection of the two subject walls to the desired position in the graphical viewer window and the dimensions as shown in the check and entry boxes at right will change accordingly. Buttons are provided to allow the user to edit the wall intersection criteria, save edited criteria, clear the above-described fields, or exit from this section of the program.

Figure 11:
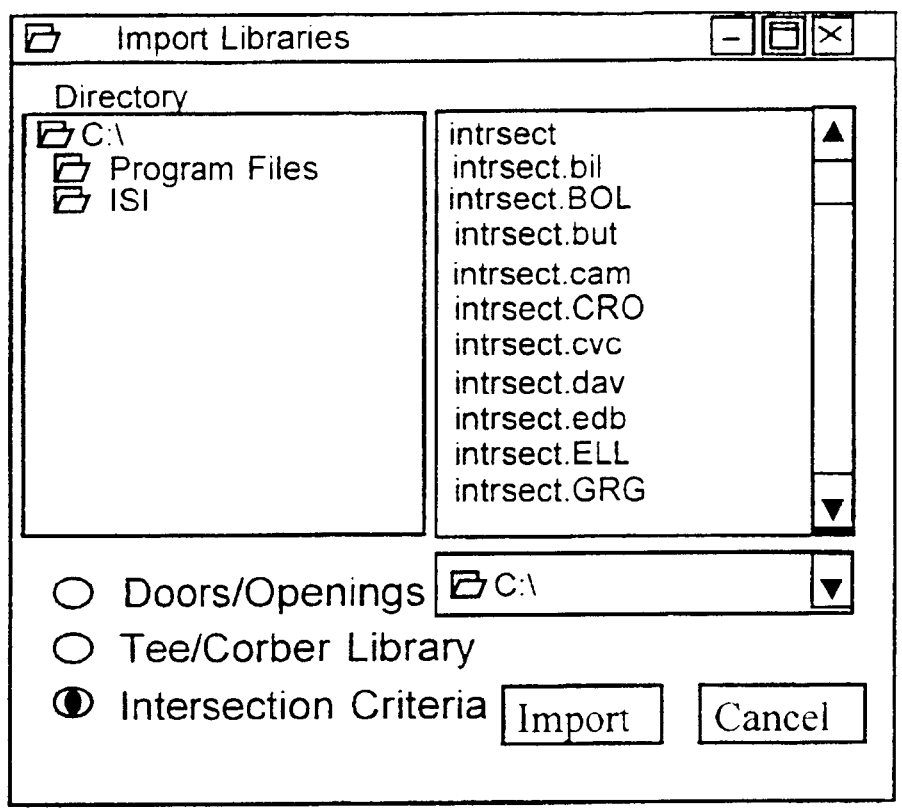
FIG. 11 illustrates an exemplary user interface for importing pre-defined wall intersection criteria or any other framing components or parameters from an existing library.

FIG. 11 illustrates an exemplary user interface for importing pre-defined wall intersection criteria or any other framing components or parameters from an existing library. All program files are stored in a namesake directory, and an entire layer of files corresponding to intersection criteria are stored in a subdirectory or folder called ISI (preferably, the collection of files for each type of framing component or parameter is stored in a separate subdirectory or folder). The collection of files specifying intersection criteria are displayed to the right. At bottom left a check box filter may be checked to limit the display to a particular type of component (Doors/openings, Tees/corner libraries, or Intersection criteria). The user may select one or more of the file types listed and may import them into an existing floor plan simply by clicking import button.

The next step in completing the third task 4 is to cut the walls into panels. There are a number of ways to accomplish this, all are accomplished via the Primary Editing Screen of FIG. 1, and all are accessible therein from the EDIT Menu by clicking on>CUT WALL.

The first menu option is CUT TO LINE. When this is selected the user is instructed to "Place Cursor On Wall To Cut", and then "Point To Cut Line". The wall will be cut and the user may proceed to the next wall to be cut.

The second menu option is CUT TO DIMENSION. When this is selected the user is instructed to "Place Cursor On Wall To Cut". Once done, the Value Box of FIG. 9 will appear and the user may input the length of the wall to be cut. He clicks OK and the wall will be cut to the dimension chosen.

The third menu option is QUICK CUT. The QUICK CUT option allows the user to randomly cut walls where needed. When this is selected the user need only click in the viewer window at a point on the wall to be cut, and the wall will be cut there.

Referring back to the introductory checklist of tasks to be completed by the user in FIG. 3, the fourth major substantive task 5 that the user must complete in order to generate a proper floor plan is to set any Bearing, Rake, Hidden or Option WaUs.

Load bearing walls are set at step 120 via the Primary Editing Screen of FIG. 1 by selecting EDIT then>SET BEARING WALLS. The user may then point and click on the walls that need to be coded as load bearing walls in the plan. These walls change color in the preview window, e.g., turning from black to cyan on the screen indicating that they are now classified as bearing walls. Once designated as such, the program knows that the selected walls are load bearing when adding trusses to the floor plan.

Rake walls are set at step 130, and these are walls having a top slope. These are necessary to accommodate sloped ceilings such as cathedral ceilings. These rake walls are similarly designated from the Primary Editing Screen of FIG. 1 by selecting EDIT then>SET RAKE WALLS. The user may then point and click on the walls that need to be coded as Rake walls in the plan. Once designated as such, the program knows that the selected walls are rake walls and will automatically fit the top slope to the adjoining sloped ceiling.

Hidden walls are set at step 140 and are those that should be ignored when compiling the final floor plan so as not to affect adjoining walls. These hidden walls are similarly designated from the Primary Editing Screen of FIG. 1 by selecting EDIT then>SET HIDDEN WALLS. The user may then point and click on the walls that 15 need to be coded as hidden walls in the plan, and they are shown in dotted lines. Once designated as such, the program knows that the selected walls are hidden walls and will ignore them so as not to impact the floor plan.

Option walls are set at step 150 and are those necessary to accommodate optional components such as bay windows. Once designated as such, option walls can be turned on or off for purposes of compiling the final floor plan. These option walls are similarly designated from the Primary Editing Screen of FIG. 1 by selecting EDIT then>SET OPTION WALLS. The user may then point and click on the walls that need to be coded as option walls in the plan, and they are color coded. Once designated as such, the program knows that the selected walls are option walls and will selectively compile or ignore them in the compiled floor plan.

Referring back to the introductory checklist of tasks to be completed by the user in FIG. 3, the fifth major substantive task 6 that the user must complete in order to generate a proper floor plan is to set the walls or sections thereof to be sheathed. This information is used to demarcate the "Wall sheathing zones", and this zone information is posted to the database in a layer of separate files with the *.sht extension. To add wall sheathing (FIG. 4*d*, step 190) from the Primary Editing Screen of FIG. 1, the user selects from the menu ADD and then>ADD WALL SHEATHING. Again, the Material Code Screen of FIG. 5 appears and the user is prompted to verify or change the wall sheathing specifications. The user chooses from the Material Code Screen the sheathing they wish to use. The user may select SOME>OK, in which case they are returned to the Primary Editing Screen of FIG. 1 and may point and click on walls that sheathing is to be placed or changed. The user may select ALL>OK, in which case they are returned to the Primary Editing Screen of FIG. 1 and all walls are sheathed. When the user is finished sheathing walls he clicks DONE and the routine will terminate. All walls to be sheathed and their appropriate sheathing may be specified in this manner. All walls to be sheathed are color coded and appear, e.g., as a green line. Sheathing may be deleted from the floor plan via the menu by selecting DELETE, and then SOME (allowing the user to point and click at the sections they wish to delete), or ALL (choosing this option will remove all sheathing). Alternatively, the user may select EXCHANGE if they wish to exchange sheathing.

Next, if desired, at step 170 of task 5 beams and girders may be placed on the plan to develop concentrated loads.

FIG. 12 shows the beam configuration window by which beams are added to the floor plan. The Beam Configuration area allows user selection of basic beam attributes such as "Flush" or "Drop" type, "Plys" and "Material Type". Alternatively, a user-defined beam configuration is possible to accommodate non-conventional beams. Selection of the user-defined beam configuration check-box enables entry of data into user-defined beam configuration area. Beam Post Specification Area allows entry of posts corresponding to each beam. A beam loading specification area is provided to allow user-input of load constraints, and lumber selection can be changed at the Current Lumber window. The above beam configuration information is stored in a layer of separate files with the *.bem extension.

Upon completion of the above-described steps the program will have assimilated much of the component information for the floor plan envisioned by the user. The computer program tracks the progress of the user and will indicate successful completion of major tasks 2–8 with a check mark in the appropriate check box in FIG. 3.

All of the above-described component data selected or entered by the user including location, length, width, and depth of walls, intersection criteria, rough openings and all other defined framing component points and attributes associated with the open floor plan are written to a computer database file. All such points and attributes are stored in a standardized file structure called "Boxpoints". The Boxpoints structure includes the following defined variables.

Bottom Left X (x dimension for bottom left coordinate)
Bottom Left Y (y dimension for bottom left coordinate)
Top Left X (x dimension for top left coordinate)
Top Left Y (y dimension for top left coordinate)
Top Right X (x dimension for top right coordinate)
Top Right Y (y dimension for top right coordinate)
Bottom Right X (x dimension for bottom right coordinate)
Bottom Right Y (y dimension for bottom right coordinate)
Base Elevation (y offset from dimension for bottom left coordinate)
Depth (depth of framing component)
Pointer Variable (pointer to associated records)
Object Name (name of framing component)
Lumber Code (code indicative of type of lumber)
End Type This structure can be used to store many types of objects in 3d by saving the four side surfaces of the object as well as the top and bottom surfaces.

Component categories or "layers" are created by using a file or plan name plus a dedicated object or layer name extension. For example, the wall panels for floor plan "Test" would be stored in "Test.flp". Similarly, the openings for floor plan "Test" would be stored in "Test.opn". All known object layers which use this structure and their associated file extensions are as follows;

Walls—.flp
Opening locations (windows, doors, medicine cabinets, recess panels etc)—.opn
Floor System Section Boundaries—.jst
Beams—.bem
Holes (tubs, toilets, vents, piping, etc)—.hol
Knee Walls—.ane
Joists—.joc
Ducts—.auc
Wall parts (studs, openings, intersections)—.wac Roof System Section Boundaries—.ros Wall sheathing zones—.sht Roof Trusses and rafters—.roc Sheathing pieces—.shp In addition to dimensional information, objects can have associated attributes such as material type, etc. Further layers of attribute information are defined and associated with the layers of objects. The attribute information is stored in two separate files. This separation of attributes from objects increases the video "redraw speed" of the object itself when the attribute information is not needed. Known attribute layers are as follows.

Wall attribute layers include the following:
    Bottoms Top, and Double plate material types
    Stud material type, spacing, plys, offset
    Mid span blocking type, elevation, number of rows
    Rake or sloping top or bottom surface of wall info
    Associated ceiling planes Joist attribute layers include the following:
    Section elevation
    Spacing
    Direction
    Depth
    Loading Info
    Joist Type (lumber, engineered, open web)
    Plys
    End conditions (top or bottom bearing, hanger info)

Beam attribute layer
    Depth
    Loading info
    Beam type (lumber, engineered)
    Plys
    End conditions (top or bottom bearing, hanger info)
    End bearing post configuration The program uses this attribute information to create the individual "child parts" within the object layers as well as the parts physical x,y,z world coordinates. For example, if Wall1 .flp is a record in the object layer ".flp", it will store the wall object Wall1 in 3d by saving the four side surfaces of the wall as well as the top and bottom surfaces. The associated record Wall1.waa in attribute layer ".waa" stores the information regarding where and how the studs and plates etc should be created for "Wall1". All records that store the physical size, location, and material type of the parts that belong to "Wall1" are stored in the associated object layer ".wac". Each child record in ".wac" has its Pointer Variable set to refer back to its single parent record in layer ".flp". If the user wanted to see a drawing of "Wall1", the program would retrieve the height, width, and depth of "Wall1" from the ".flp" layer and would then search and include all child records found in the ".wac" layer.

For ease of code purposes, information such as notes, dimensions, and labels are also stored in their own layers using the Boxpoints structure.

Once the first five major substantive tasks 2–6 are completed as described previously, the database carries all information necessary to generate a proper floor plan. All is ready for the sixth task for completion 7, which is to run the Build! routine in order to assimilate all previously input data and to build the actual three-dimensional Floor plan. To accomplish this the user navigates the Menu as folows: GROUP>PANELS>BUILD ALL in order to run the Build Routine. The introductory checklist of tasks arises as shown in the visual display 1 of FIG. 3. Completed tasks are checked, and uncompleted tasks are not. The program will allow the user to proceed to the Build! Stage 7 only upon completion of prerequisite tasks 2–6. Short of this point the user is forced to cancel out of the visual display 1. Upon pressing the "Cancel" button, the user is returned to the Primary Editing window of FIG. 1 and may navigate this window at will to further complete any unfinished prerequisite tasks. Once the user is cleared to proceed to the Build! Stage 7, he hits the Build! Stage Button 7. The Build Routine then initiates compilation of the computer database, checks for logical errors, and automatically adds studs and any other necessary components into the floor plan. The Build Routine 7 generates the completed floor plan including all location marks, symbols, material, grades and placement information of all intersecting entities are stored in a computer file for said wall.

Figure 4E:
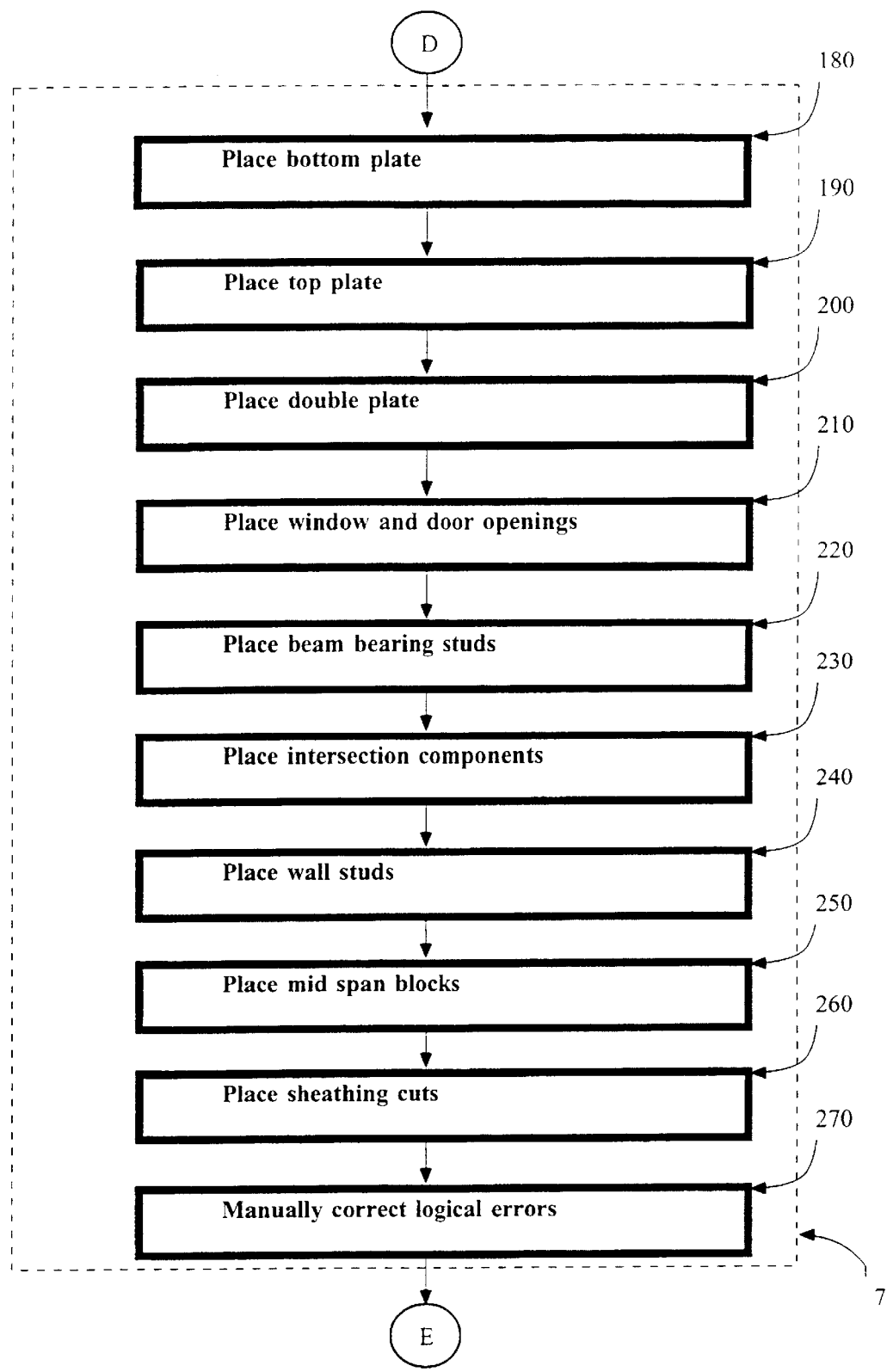
Figure 4F:
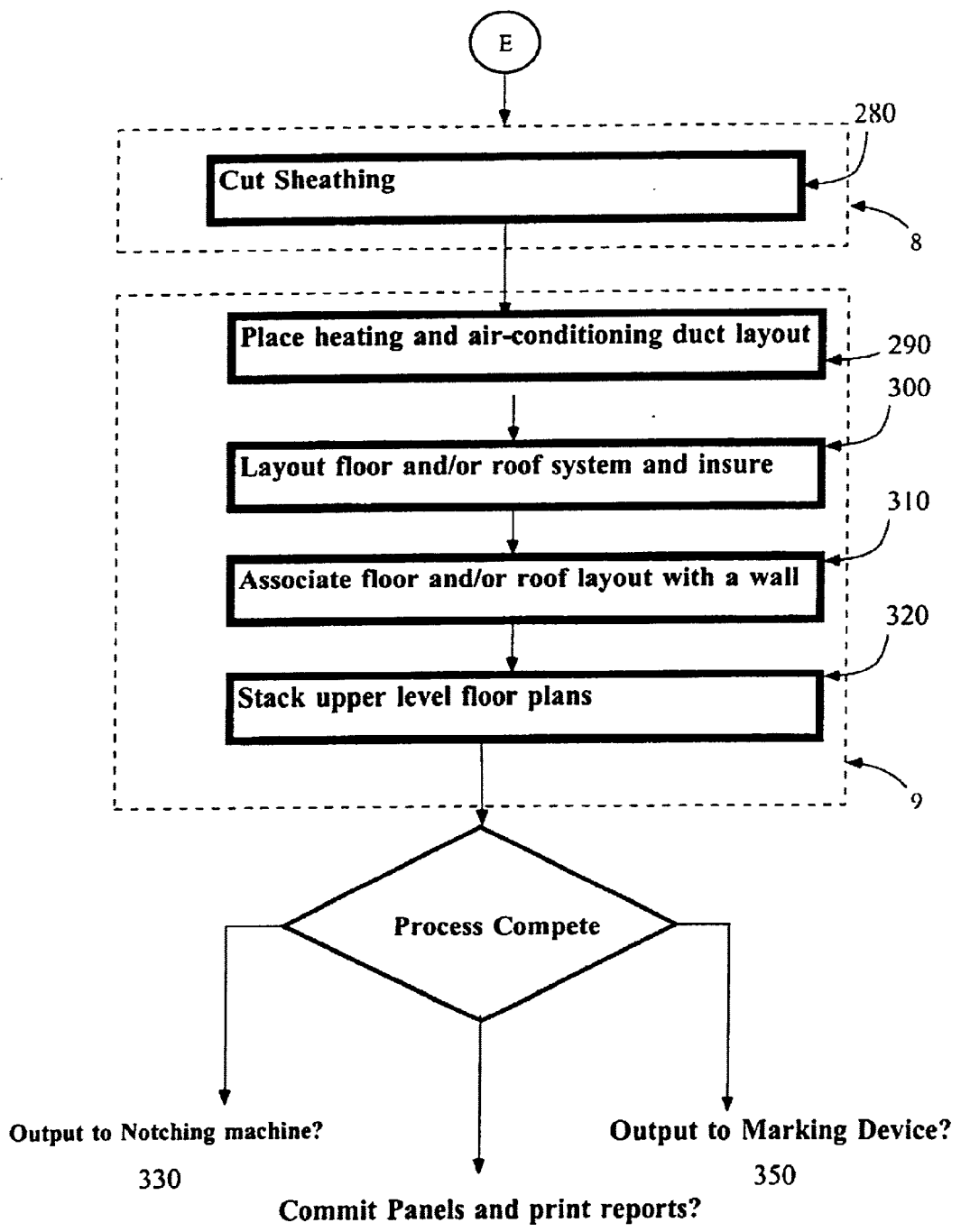

As shown in FIG. 4e, the Build Routine 7 comprises a series of nine steps 180–260 which parse through the flp layer to "build" each wall. The Build Routine 7 uses a "consumed space" theory by placing the most important to the least important objects inside the wall boundary. The Build Routine 7 builds each wall in order of the following prioritized steps.

180: Place bottom plate
190: Place top plate
200: Place double plate
210: Place window and door openings
220: Place beam bearing studs
230: Place intersection components
240: Place wall studs according to spacing if space is not already occupied by one of above
250: Place mid span blocks
260: Place sheathing cuts This Build! routine creates all the physical parts required to construct the individual walls. This "part" information is posted to the database for sorting and batching. If logical errors are found in the database, the user can manually correct the errors.

Figure 13:
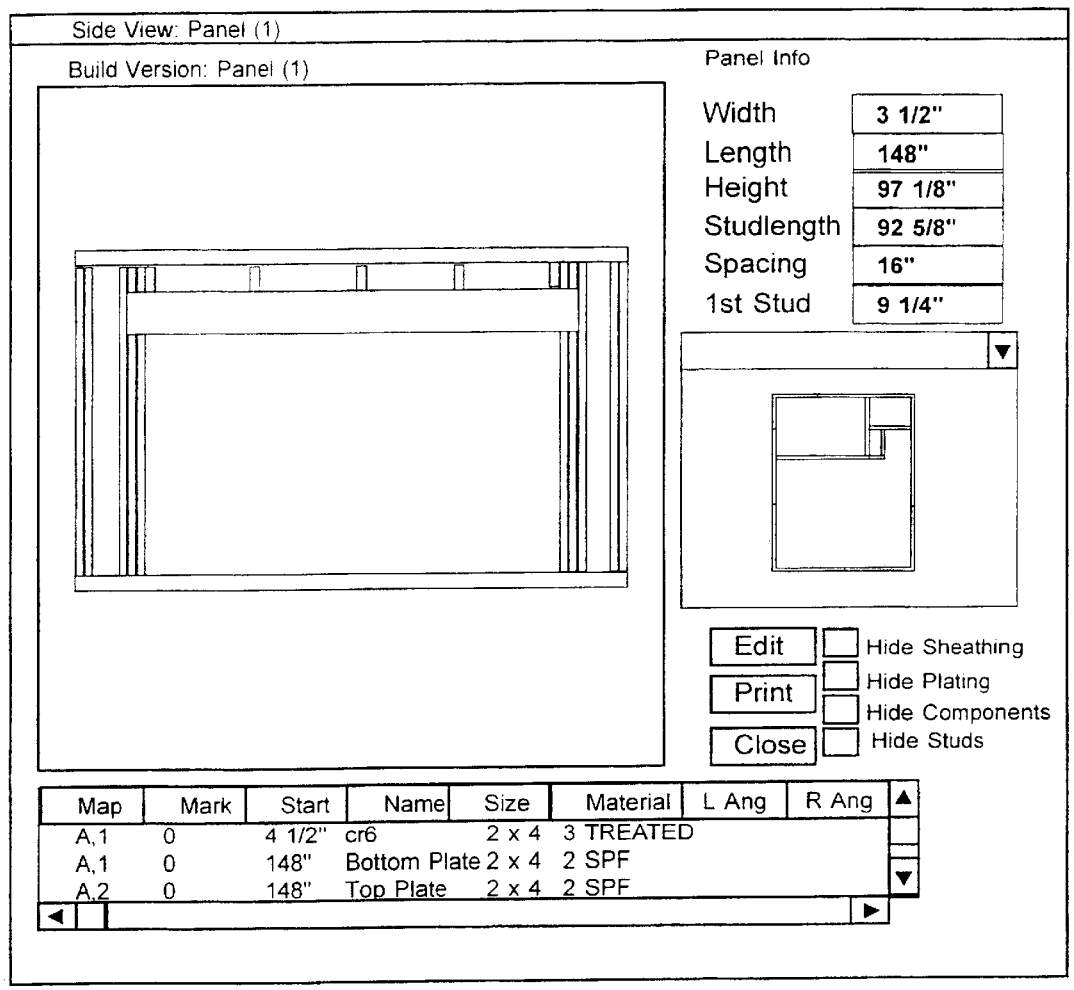
FIG. 13 shows the Wall Panel Side View Box.
Figure 14:
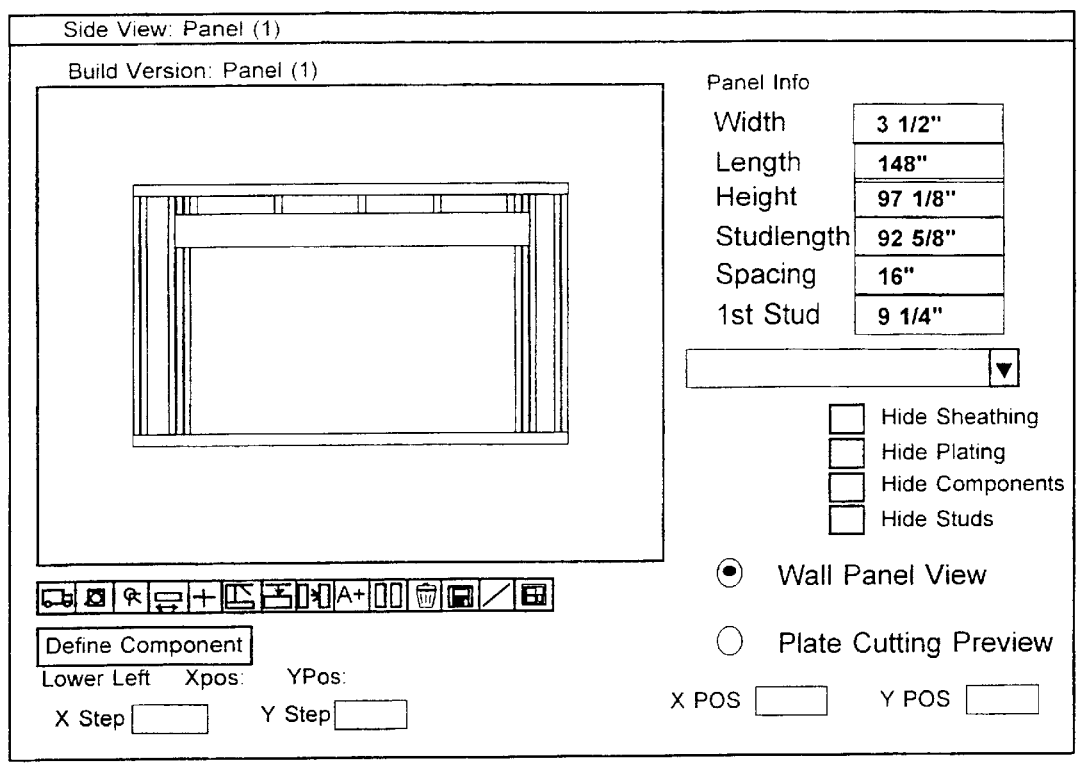
FIG. 14 shows the Panel Editing Window.

At step 270, the user is provided with a number of graphical tools to allow him to go back and refine his floor plan and/or correct logical errors. For example, from the Primary Editing Screen of FIG. 1, the user can select (highlight) a wall panel and then navigate the Menu, pressing VIEW and then>WALL PANEL. The user is then confronted with a number of options. Should the user select the>VIEW ONE option, then the Wall Panel Side View Box of FIG. 13 will appear. The Wall Panel Side View Box of FIG. 13 initially shows a large blank preview screen on the left, a small Panel Info description box in the upper right-hand corner, a small floor plan preview box in the middle right side (with the users open floor plan showing) and a CLOSE button in the lower right-hand corner. The user simply clicks on a wall panel shown in the floor plan box. The selected panel appears in detail in the larger preview window at left. At the same time, EDIT and PRINT buttons appear beneath the floor plan preview box. A number of HIDE buttons also appear and these allow the user to filter out selected components from view. The Panel Info description box in the upper right-hand corner now shows all the information about the selected panel, and all individual component specifications appear in spreadsheet format beneath the Preview window. This preview feature serves as a simple cross-check, e.g., if the user forgot to cut the sheathing after the Build! routine, he can click on the CLOSE button and go over and cut the sheathing. The user can also click PRINT to print the selected Panel. If the user would like to edit the panel he may click EDIT to bring up the Panel Editing Window shown in FIG. 14. The Panel Editing Window of FIG. 14 includes a Panel Preview window which shows the selected panel. When the user clicks on an object in the Panel Preview window the object will change color (e.g., turn to black), thereby indicating the selection. A plurality of editing tools appear as icons beneath the Preview Window, and these accomplish the following functions (respectively, from left to right).

MOVE: When the user click on the MOVE icon the user will be prompted to click on an object and drag it to its new location.

DIMENSION: When the user click on the DIMENSION BUTTON the user will be asked to click on the first object from which to measure the dimension, and then to click on the next object to to complete the dimension. A temporary dimension line will appear between the selected objects and the dimension will be calculated and shown.

ZOOM: When the user click on ZOOM BUTTON, they are prompted to select the center of where the user would like to zoom. This can be repeated until the user is content with the preview size.

LENGTH: When the user click on the LENGTH BUTTON the user will be asked to click on the object the user wishes to adjust. Once done, a box appears showing the user the actual length and prompting for a new length. The user enters the new length and clicks OK, thereby making the adjustment.

ADD COMPONENT: When the user clicks on the ADD COMPONENT BUTTON a pull down menu of components appears. The user selects what the user wishes to add. Next the user is prompted to "accept" or "cancel" the selection. When the user "accepts" the Material Code Screen of FIG. 6 appears and the user is prompted to verify or change the material codes. After doing so the user clicks OK, and the user is prompted to enter a dimension. Once done, the user is prompted to select the Move Button and may then drag the object wherever the user wishes on the Preview Screen. The user may fine tune the "x" and "y" locations manually by typing locations into the small X POS and Y POS boxes on the lower right side of the window.

FLIP: When the user click on the FLIP BUTTON it will automatically rotate the last object the user have clicked on.

JUSTIFY: When click on the JUSTIFY BUTTON it will automatically locate and right, left or center justify the last object the user selected.

COPY: When the user clicks on the COPY BUTTON the user will be prompted to click on the item the user wish to duplicate. He clicks on that item and immediately the component is duplicated. Now the user can click on Move to move that object wherever the user wishes.

CHANGE GRADE/SPECIES: When the user click on CHANGE GRADE/SPECIES BUTTON the user will be asked to click on the object which the user wish to have the wood grade or species changed. The Material Code Screen of FIG. 5 appears and the user may select the thickness, width, grade, and species for the object.

HIDE/UNHIDE: When the user click on the HIDE/UNHIDE BUTTON the user will be asked to click on the object the user wish to hide. After the user clicks on that object an information box will appear asking the user "does the user wish to hide/unhide this item?" The user may click "Yes", "No" or "Cancel". When an object is hidden it is shown as a dotted outline rather than a solid outline. When the user Unhides an object it turns back to a solid outline rather than the dotted outline.

DELETE: When the user click on the DELETE BUTTON the object highlighted in black is registered for deletion. An information box appears and the user must confirm deletion of the selected component.

SAVE: When the user click on the SAVE BUTTON an information box will appear, and prompts the user to confirm whether to save his edits.

EXIT: This exits or leaves the Wall Panel Editor and returns to the View One Panel screen of FIG. 14.

FIT: When the user click on the FIT BUTTON it will automatically reposition the wall panel in the center of the box, and will unzoom the preview screen.

REFRESH: When the user click on the REFRESH BUTTON the screen will be automatically refreshed. (Note: all reference dimensions set up by the user are erased).

A define component button appears below and this allows the user to define any component on the fly.

Figure 15:
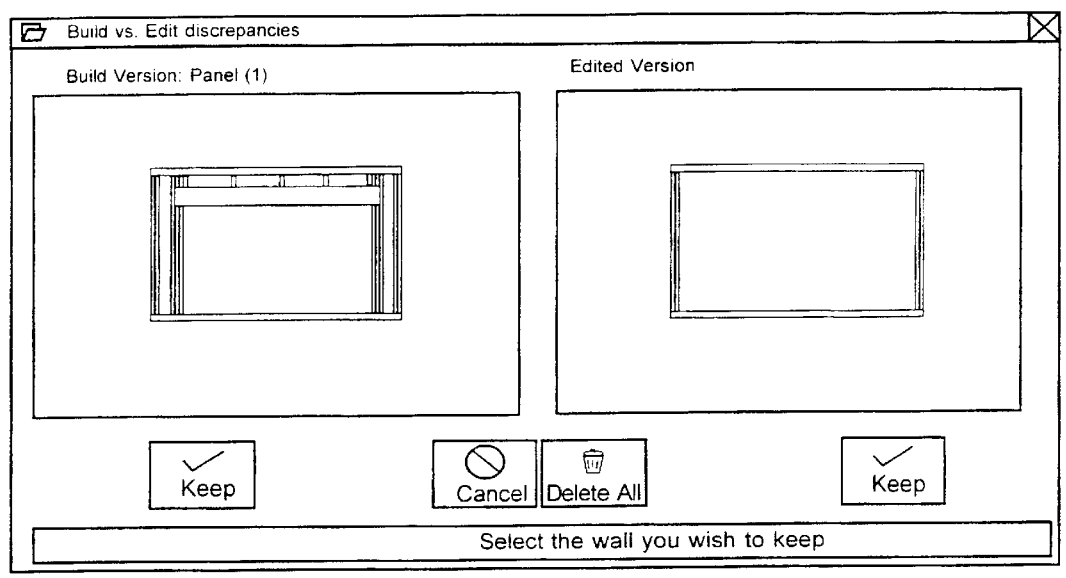
FIG. 15 shows the "Build vs. Edit Discrepencies" window.

Once all of the logical build errors have been manually corrected, the user is presented with the "Build vs. Edit Discrepencies" window of FIG. 15. This shows a side-by-side comparison of the original component version and the corrected version. The edits are not immediately posted to the database, and the user may selectively keep or discard the edited version by clicking the appropriate KEEP button.

The seventh task for completion 8 is to cut the sheathing and to run a sheathing routine that calculates the sheathing square footage based on the walls selected to be sheathed in the fifth task 6. Sheathing may be cut (FIG. 4*f* step 280) by selecting ADD>SHEATHING>CUT from the Menu. The user is prompted to either cut out the openings or to sheet through the openings. The minimum sheathing square footage is automatically calculated from an optimal combination of cut patterns in light of standard sheathing sizes.

At this point all information and components corresponding to one story of a finished floor plan is in the database and ready to be compiled. However, the intended structure may have two or more stories, and a few final steps in the process may be necessary to account for multiple story structures. These steps are shown at item 9 in FIG. 4*f*.

At step 290, the user can place heating and air-conditioning ducts on the plan.

At step 300 the user can lay out the floor and/or roof system and insure that any potential collisions are avoided.

At step 310 the user can associate the floor and/or roof layout with the wall stud layout to align the two. Proper alignment of the wall studs with the studs of the floor or roof system increases the structural integrity of the floor plan.

At step 320 the user can stack upper level floor plans "above" a lower level plan to check vertical alignment of concentrated loads, stairwell alignment, etc. This may be accomplished by running a "Stacking routine" which automatically calculates loads and compares vertical alignments.

Throughout the above-described steps 290–320, the user is free to hand edit any wall component for size or location. Again, this is accomplished using the component editor shown in FIG. 7. The component editor can be called upon to edit an existing wall panel component by double-clicking on the given component shown in the Panel View Window (see FIG. 13).

Figure 16:
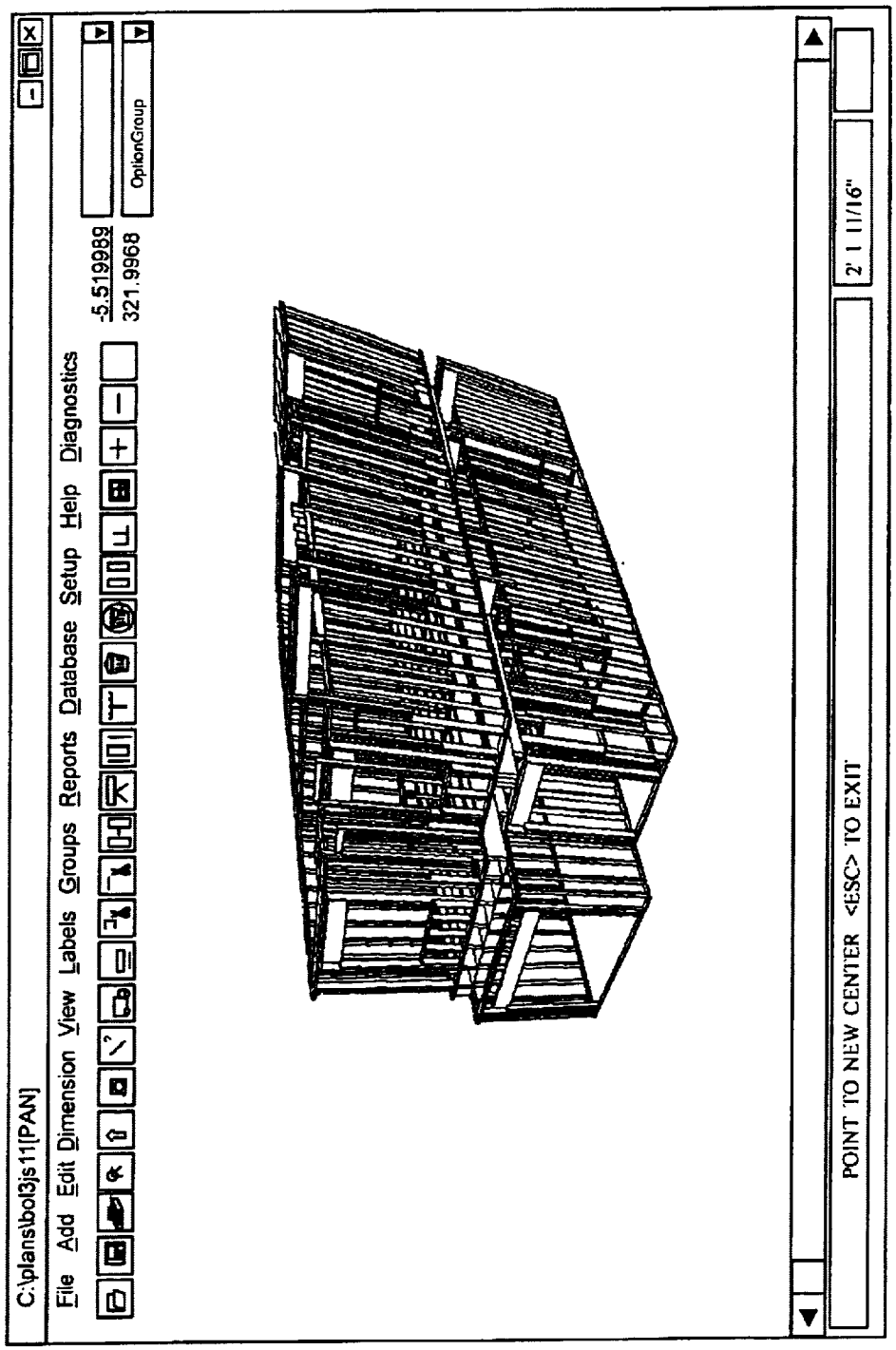
FIG. 16 is three-dimensional graphical illustration of a completed floor plan.

Following execution of all of the above-required tasks 2–8, the Floor plan can be recompiled, generated, and printed or edited at will. FIG. 16 is three-dimensional graphical illustration of a completed floor plan which can be accessed by clicking VIEW>3D on the main menu.

Figure 17:
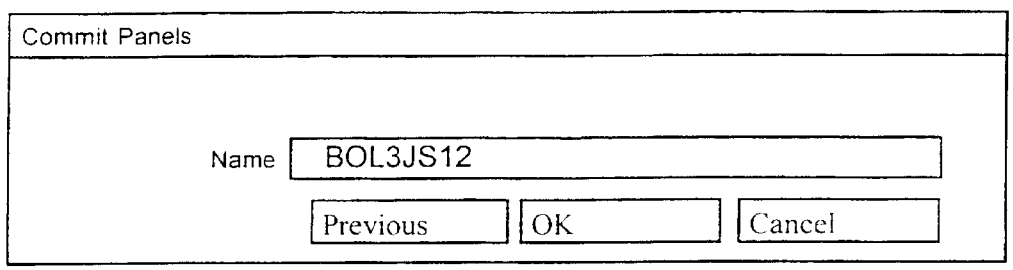
FIG. 17 is the Commit Panels Screen.

In addition, a number of useful reports can be generated at step 340 to assist in ordering or shipping the necessary lumber, and to give organized material lists and cutting information for batches. To accomplish this, the user must select DATABASE>COMMIT PANELS from the main menu. This begins the process of exporting the three-dimensional model data to a database format (Microsoft Access is currently being used, though other commercial databases may be suitable). A Commit Panels Screen appears as in FIG. 17 and the user chooses a name and clicks OK to begin the Commit Process. A prompt appears letting the user know that the information is being transferred into a database for use in creating reports. When the routine is finished the screen will return to the Primary Editing Screen of FIG. 1. However, the database can be opened in Access, and FIGS. 18–23 illustrate exemplary reports that can be gleaned from the database information and which simplify administration.

FIG. 18 is an opening cut list which lists all opening and opening types in the floor plan and list of components by component type with specifications necessary to build the openings.

FIG. 19 is an opening assembly list which lists all opening and opening types in the floor plan and a list of all components organized by opening.

FIG. 20 is a sheathing cut list which lists all sheathing sections to be cut for all wall panels.

FIG. 21 is a lumber take-off list which totals the materials costs for all components.

FIG. 22 is a lumber pricing chart which lists the lumber SKU numbers used in calculating the materials costs in the report of FIG. 23.

FIG. 23 is a total pricing report which includes the saw costs and fabrication costs for all components.

Many other reports can be generated as desired.

Referring back to FIG. 4e, at step 330 the floor plan database may be translated and used directly to drive an automated cutting and notching machine in order to cut and notch the studs for the wall panels. An exemplary automated cutting and notching machine is shown and described in U.S. patent application Ser. No. 08/587,960 filed Jan. 17, 1996 by the same inventor herein.

Figure 24:
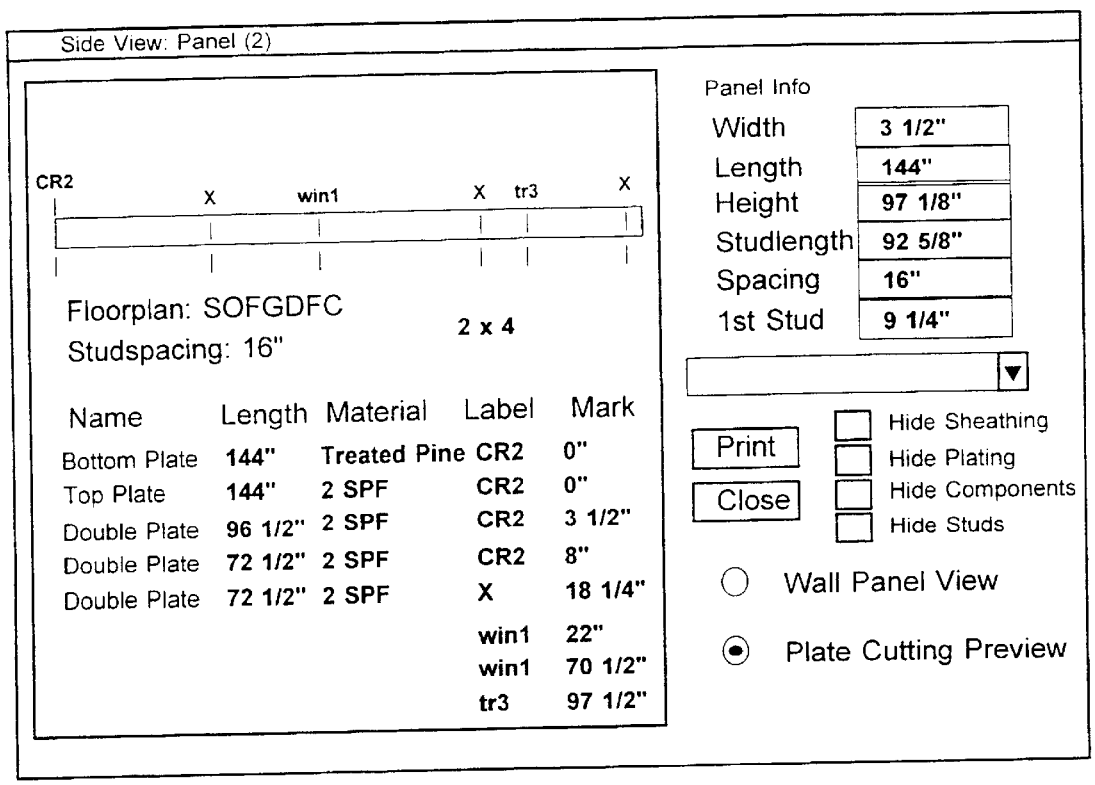
FIG. 24 is the Plate Cutting Preview Screen.
Figure 25:
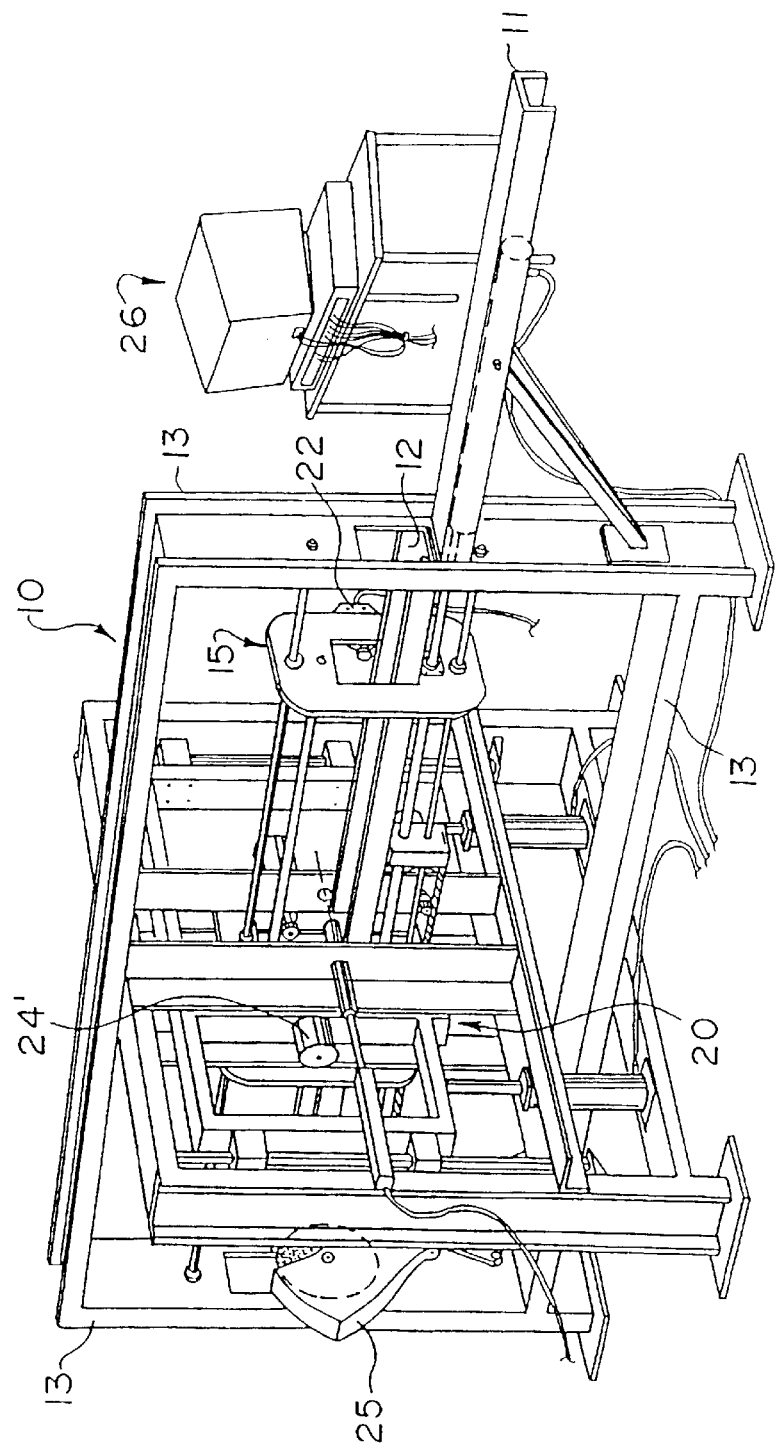
FIG. 25 is a perspective view of the cutting and notching assembly of the present invention.

Alternately, as shown at step 350 the Floor plan database can be translated into a marking layout for marking studs to be cut by a sawyer. A preview of an exemplary marking layout can be obtained by selecting PLATE CUTTING PREVIEW on the Primary Editing Screen of FIG. 1. The Plate Cutting Preview screen of FIG. 24 shows a top view of the selected Plate Component with marks for notches to be cut in accordance with the assigned stud spacing. This marking layout can be automatically and directly transfered onto framing components for cutting, notching and assembly thereof The marking layout is helpful in guiding manual cutting and notching, and the present invention includes the process and device for transferring the marking layout directly onto framing components.

Referring now to FIGS. 25–42, the cutting and notching apparatus of the present invention will now be discussed. The arrangement or apparatus provides for the controlled notching and cutting of components 1, such as studs, wall plates, shelving, lattices and furniture. In this respect, the arrangement or apparatus cuts to length components 1 such as the horizontal base plate 1 and parallel top plate 1 of a frame for a wall, while simultaneously making transverse notches therein.

Alternatively (or in addition to the cutting), the arrangement or apparatus provides for the controlled marking of components 1 to facilitate subsequent cutting and/or assembly.

The notching and marking apparatus 10 includes a support beam 11 for supporting the framing components to be notched, cut and/or marked. The support beam 11 includes a plurality of guide rails 12 that are supported by an upright frame 13. A plurality of spaced-apart rollers 14 (see FIG. 36) are disposed transversely between the guide rails 12. The wood components 1 are supported on the rollers 14 and the components 1 are easily moved from the entry to the exit of the apparatus. All of the guide rails 12 are substantially horizontal and substantially parallel to one another.

The frame 13 is a standard frame formed of welded steel beams and includes support legs that rest upon a floor or foundation for supporting the arrangement 10. Frame 13 may be arranged in various configurations as will be described, but it is essential that frame 13 support the guide rails 12 and various operative stations which perform cutting, notching and/or marking operations on the wood components 1 while in the guide rails 12.

A traveling component carriage 15 is carried by the support beam 11 near one end thereof, and is capable of horizontal movement in either direction along the length of support beam 11. The traveling component carriage 15 has an opening formed therethrough and the components 1 are disposed longitudinally through the opening.

Figure 38:
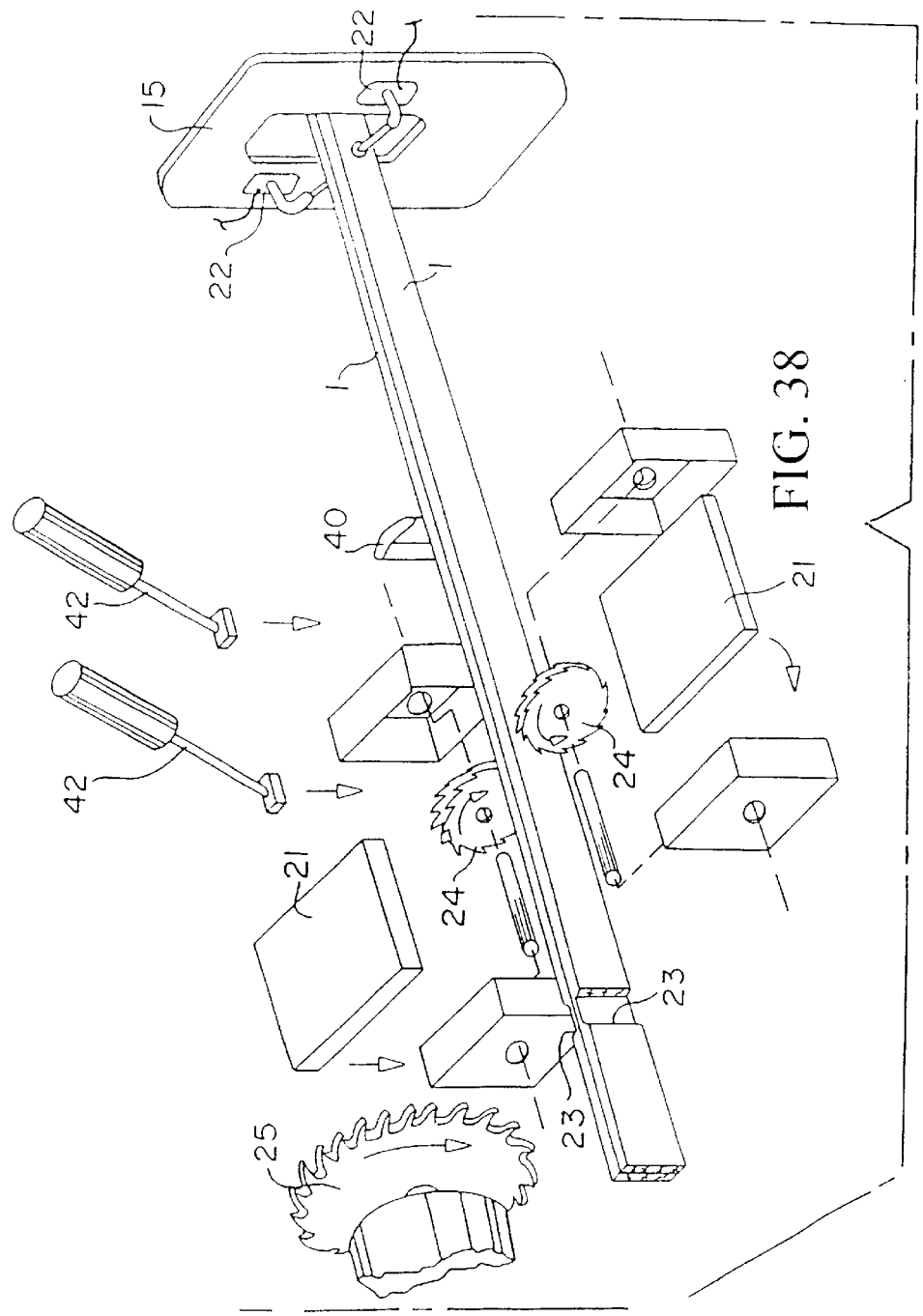
FIG. 38 is an exploded perspective view of the traveling carriage 15, the wedging means 42, and the cut-off saw 25.

As best seen in FIG. 38, a gripping fixture 22 is mounted on component carriage 15 to grip the components 1 such that the components 1 move concurrently with the traveling component carriage 15. The gripping fixture 22 preferably is a pair of pneumatic cylinders mounted on opposing sides of the component carriage 15 and wielding inwardly pointed pistons toward the wood component 1, the pistons serving as gripping pins which secure the component 1 to the traveling component carriage 15. In this manner, the pins may be moved pneumatically toward one another to engage the components 1 therebetween and secure the components 1 to the traveling component carriage 15. An optional second gripping fixture 22 may be mounted on the opposite face of the traveling component carriage 15 to better enable the components to be centered. Suitable pneumatic cylinders are manufactured by Numatics Co. as model no. 0113BAAA2. However, it should be understood that other types of actuators may be equally well-suited to serve on the component carriage 15, and these may be pneumatically, hydraulically or electrically actuated.

Referring back to FIG. 25, the traveling component carriage 15 advances the gripped base plate 1 and top plate 1 through a powered notching station 20 in a step-wise or continuous manner.

Figure 28:
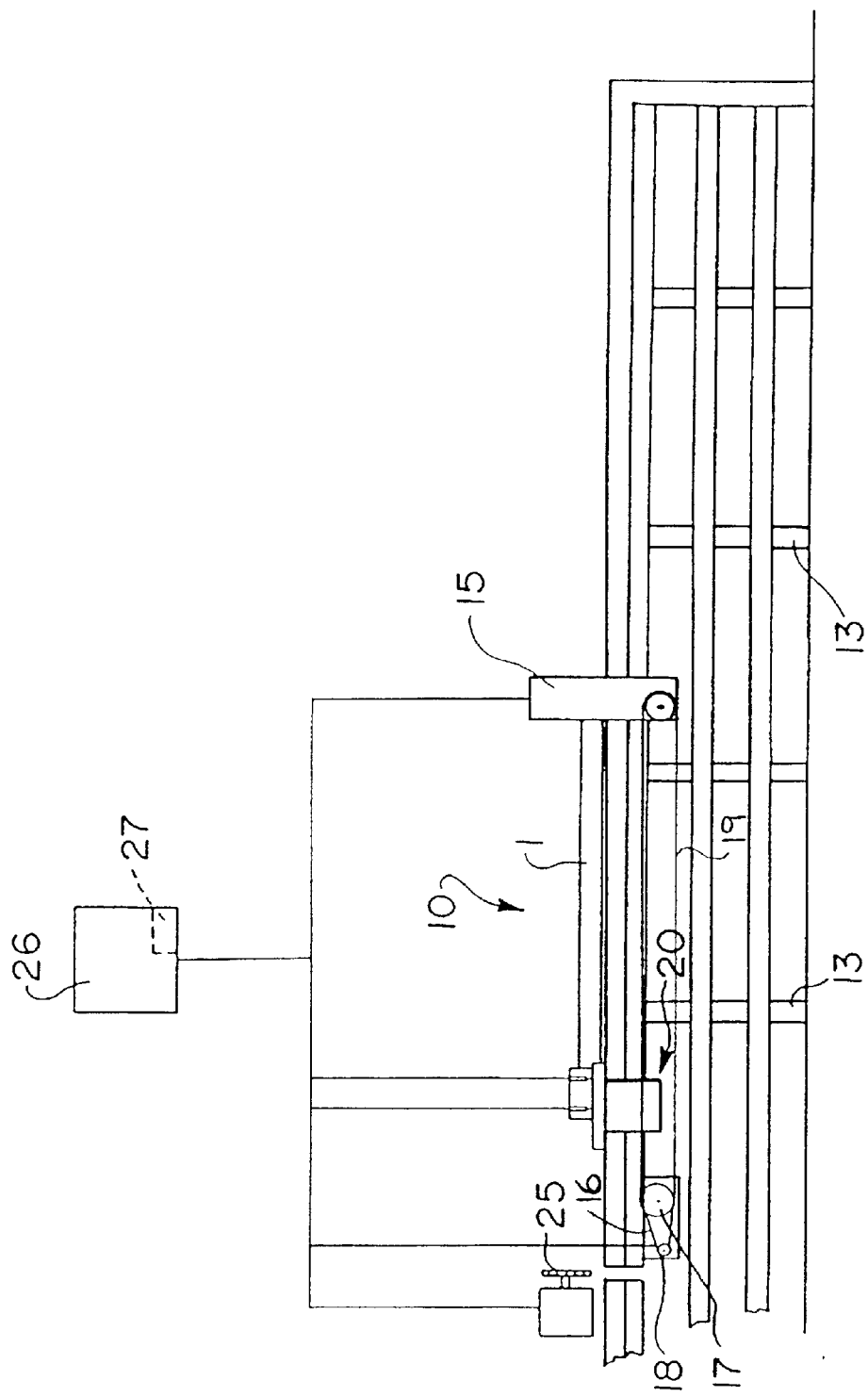
FIG. 28 is a diagrammatic side view of the cutting and notching assembly of FIG. 27 illustrating the advancement of the traveling means (means for advancing the clamped wall plates) as it moves the wall plates into the notcher.

As seen In FIG. 28, movement of the traveling component carriage 15 is provided by a belt 16 connected thereto, the belt 16 being driven by a drive wheel 17 connected to a stepper/drive motor 18. It is preferred that the drive wheel 17 have a plurality of teeth formed on the outer circumference thereof (a sprocket). A continuous toothed belt 19 engages the teeth on the drive wheel 17 and also engages a toothed axle on the stepper/drive motor 18, the axle having a smaller circumference than the drive wheel 17. In this manner, a small rotation in the axle of the stepper/drive motor 18 is transformed into a larger rotation of the drive wheel 17 and thus, increased control over movement of the traveling component carriage 15 is obtained. The stepper/drive motor 18 is reversible. In this fashion, the traveling component carriage 15 is selectively stepped/driven to advance in a first direction along support beam 11, or to retract, reciprocally, in a second opposite direction. The traveling component carriage 15 moves in the first direction along 5 support beam 11, and pushes the components into operational contact with the notching/cutting/marking station 20. Notching/cutting/marking station 20 is carried by the support means 11 near an end opposite that of traveling component carriage 15.

A notching station 20 is provided for selectively notching the framing components that are brought into contact therewith. As can be best seen in FIG. 26, one embodiment of the notching station 20 includes a notching carriage 21. The notching carriage 21 carries powered notching means for making transverse notches in the wall plates of the frame, as will be discussed at length below.

Also included in the notching station 20 is a wedging means 42.

As seen in FIGS. 29–35, the notching station 20 further includes at least one, and in the case of a double-sided notcher, two dado-cut saws (powered notching means) 24. The dado-cut saws 24 which preferably are a plurality of ganged saws, are carried by the notching carriage 21 for selective substantially horizontal movement thereof. Such movement is provided by means for moving (advancing and retracting) the powered notching means vertically into engagement with the gripped wall plates 1.

Figure 26:
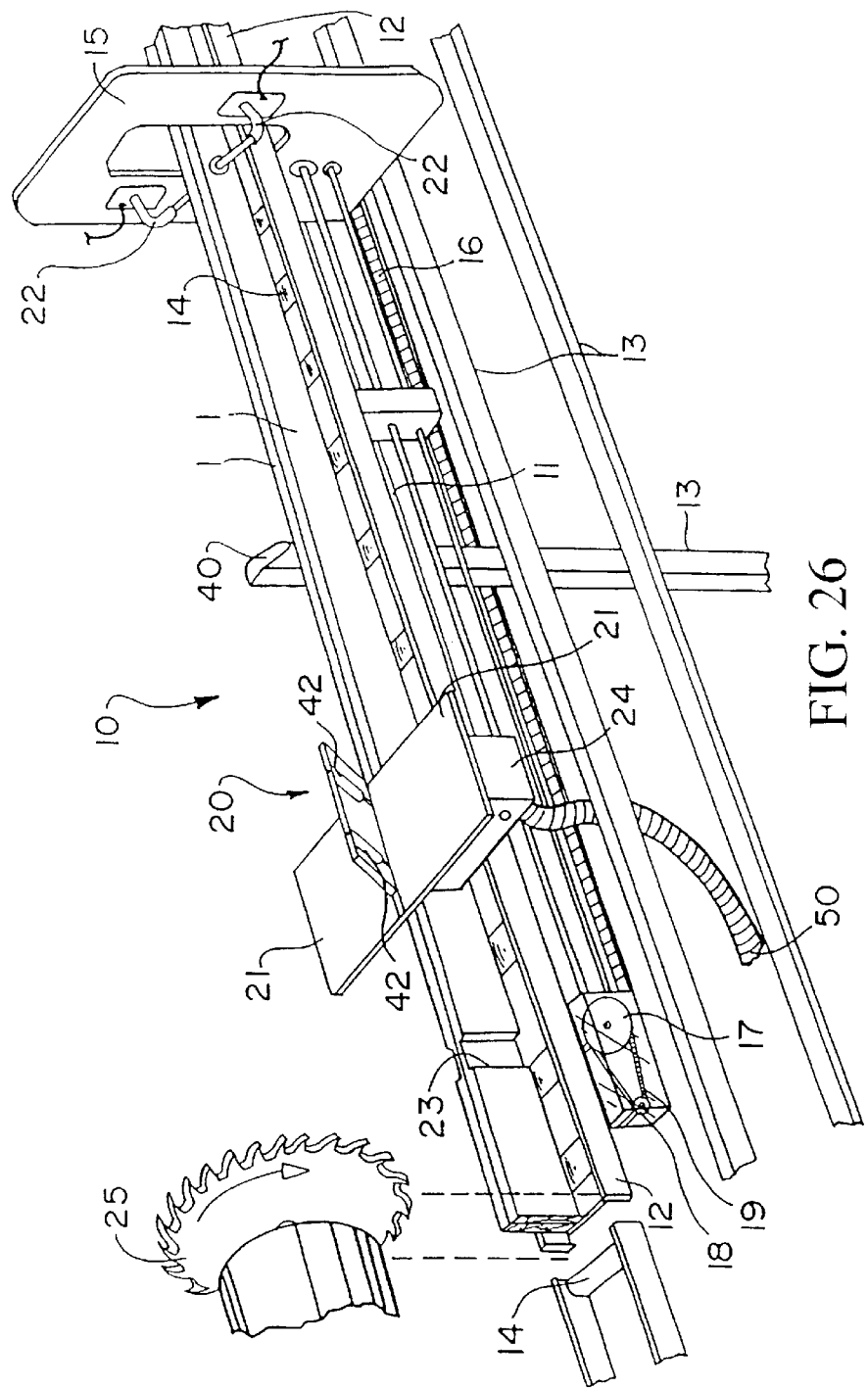
FIG. 26 is a perspective view of the cutting and notching assembly of the present invention illustrating partially finished top and base wall plates clamped within the cutting and notching assembly.

In the embodiment of FIG. 26, each notching carriage 21 is pivotally mounted on the frame 13. Each notching carriage 21 has a dado-cut saw 24 carried thereon such that each saw blade is substantially perpendicular to the longitudinal axis of the respective components 1. As the notching carriage 21 is pivoted toward the wall plates 1 and moved downwardly, the dado-cut saw 24 engages the respective wall plate 1 and begins cutting the notch 23 at the upper edge of the wall plate. As the notching carriage 21 completes the vertical movement, the dado-cut saw 24 is pivoted through a small arc to move the dado-cut saw 24 away from the wall plate and to provide a notch 23 of a constant depth in the wall plate 1. The dado-cut saw 24 is moved vertically in a first direction and then in an opposite second direction to notch spaced-apart notches 23 in the wall plates. Vertical pivotal movement of the notching carriage 21 is preferably activated pneumatically, hydraulically or electrically. The controller means 26 activates each dado-cut saw 24 independently and also controls the pivotal motion of each notching carriage 21 independently by providing individual commands to the carriages 21 and the saws 24. In this manner, the engagement of each dado-cut saw 24 can be controlled to determine the depth of the notch 23 formed in each component 1. Although in most instances, the notches 23 in both components 1 are of identical depth, the apparatus has the capability to produce a notch having a desired depth which may be different in each component 1. The notch 23 may be of a different depth at a first location compared to a second location on the same component 1. It is preferred that each dado-cut saw 24 be shielded for safety purposes.

Figure 39:
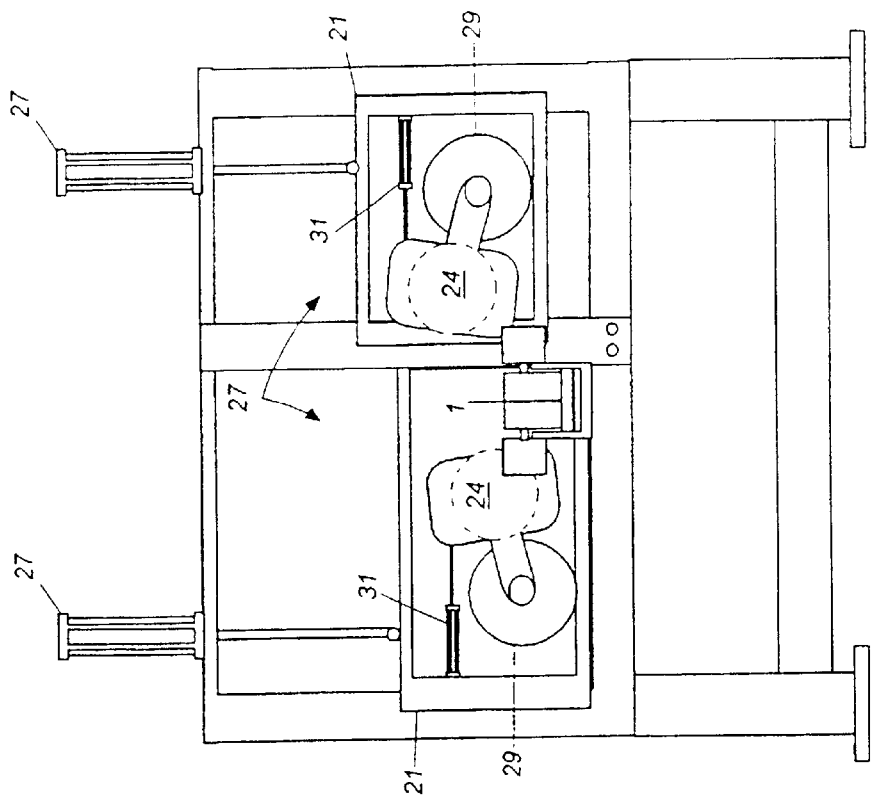
FIG. 39 illustrates another embodiment of the notching station 20 with double-sided notchers.

FIG. 39 illustrates another embodiment of the notching station 20 with double-sided notchers. In the embodiment of FIG. 39, each notching carriage 21 is slidably mounted for vertical movement within the frame 13. The notching carriages 21 are pneumatically raised or lowered into position by air cylinders 27. Air cylinders 27 are upwardly mounted to frame 13 and connected to the respective notching carriages 21 by connecting rods for controlling their vertical movement within the frame. Each notching carriage 21 has a dado-cut saw 24 carried thereon such that each saw blade is substantially perpendicular to the longitudinal axis of the respective components 1. The dado-cut saws 24 are belt driven by motors 29, and 3 h.p. conventional Dayton Industrial Co. drive motors are suitable for this purpose. The dado-cut saws 24 are pivotally mounted within their respective notching carriages 21 for controlled engagement with the wood component 1, and the dado-cut saws 24 may be pivotally pneumatically raised or lowered into position by air cylinders 31.

Alternately, (and as pictured in FIG. 25) the dado-cut saws 24 can be replaced by at least one, and in the case of a double-sided notcher, two routers 24'. The routers 24' are carried by the notching carriage 21 for the selective vertical movement. The notching carriage 21 may be easily adapted to move the routers 24' downwardly and upwardly into engagement with the gripped wall plates 1.

Figure 31:
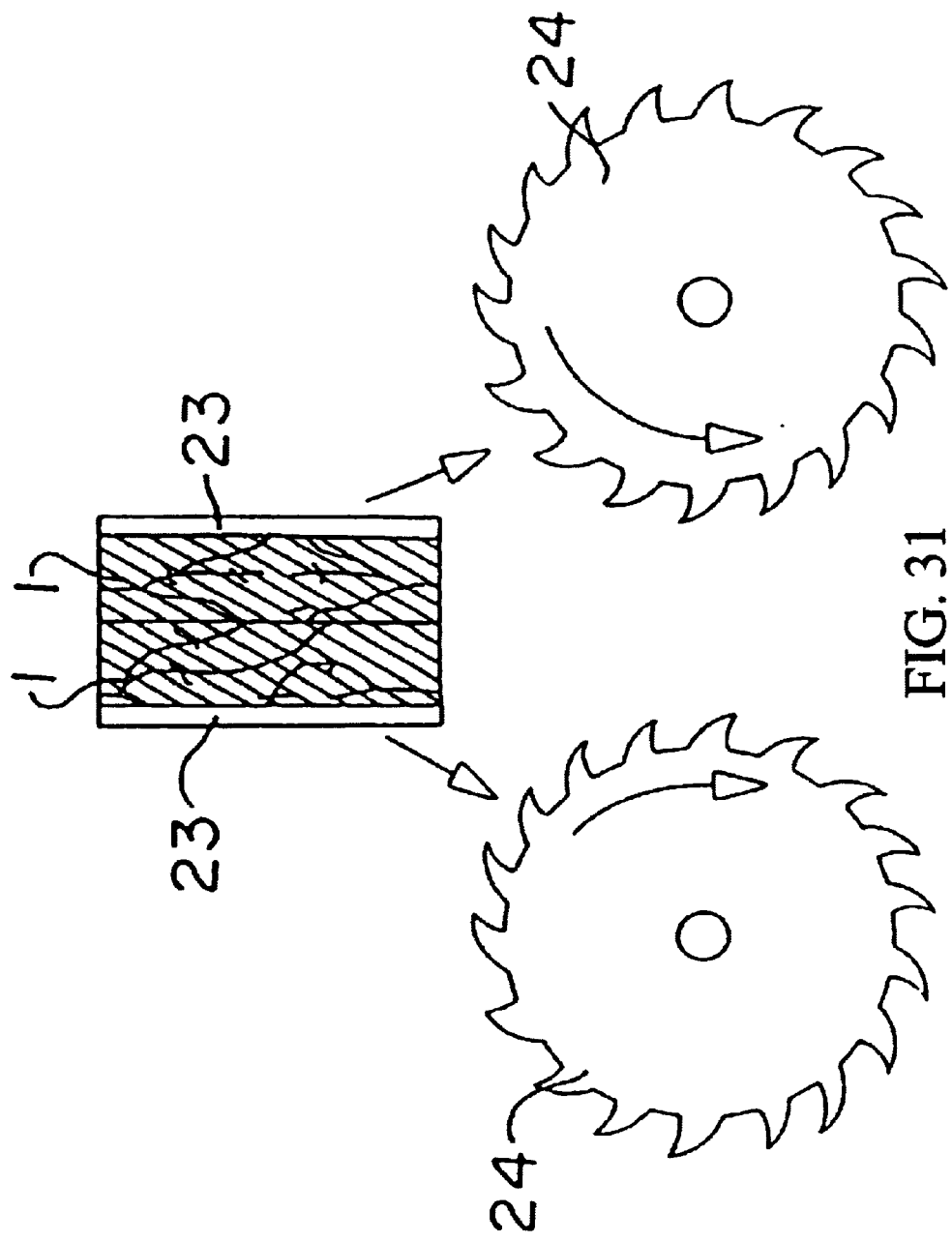
FIG. 31 is a side view showing the dado-cut saws moving downwardly and outwardly following notching of the wall plates.
Figure 33:
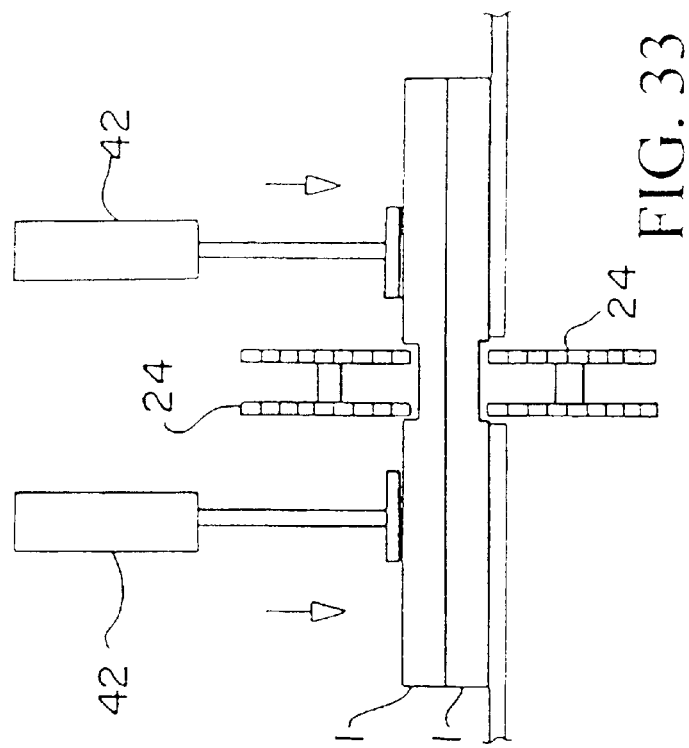
FIG. 33 is a top view showing the wedging means against the wall plates and the dado-cut saws notching the wall plates.
Figure 32:
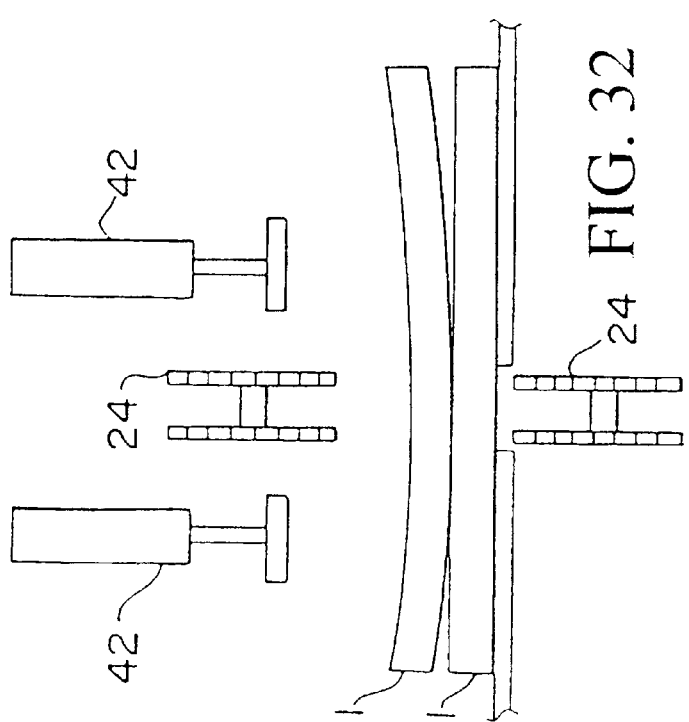
FIG. 32 is a top view showing the wall plates in the present invention prior to contact with the wedging means and the dado-cut saws.
Figure 34:
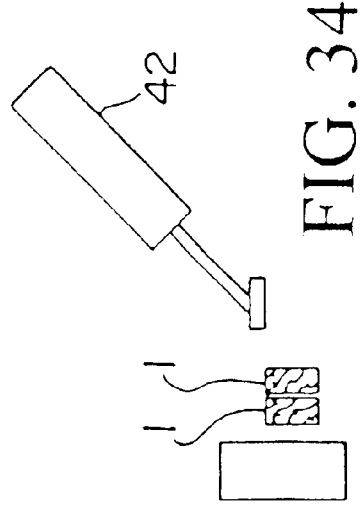
FIG. 34 is a side view of FIG. 32 showing the wedging means and the wall plates.
Figure 35:
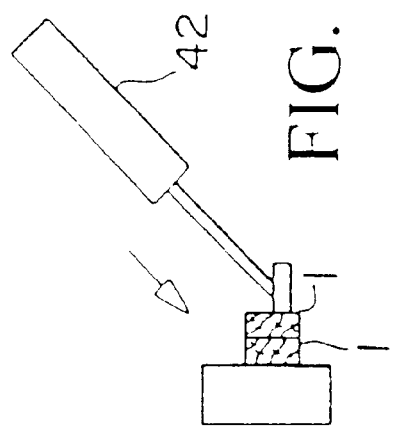
FIG. 35 is a side view of FIG. 33 showing the wedging means engaging the wall plates.

As seen in FIGS. 29–31, and with both of the embodiments of FIGS. 26 or 39, the dado-cut saws 24 move downwardly and begin cutting the notch 23 at the upper edge of the wall 10 plate. As the notching carriages 21 complete their movement, the dado-cut saw 24 is pivoted through a small arc to move the dado-cut saw 24 away from the wall plate and to provide a notch 23 of a constant depth in the wall plate 1. The dado-cut saw 24 is moved vertically in a first direction and then in an opposite second direction to notch spaced-apart notches 23 in the wall plates. Suitable pneumatic cylinders 27, 29 are manufactured by Numatics Co. However, it should be understood that other types of actuators may be equally well-suited to drive the notching carriages 21 and pivot the dado-cut saws 24, and these may be pneumatically, hydraulically or electrically actuated.

Preferably, notching station 20 is capable of double-sided notching or routing, in which case a dado-cut saw 24 or a router 24' is located on each side of the gripped base plate 1 and top plate 1, so as to straddle the plates. The dado-cut saws 24 are horizontally movable to intercept the framing components as the dado-cut saws 24 are moved, preferably conjointly, toward one another. The routers 24' may be vertically moved for making the transverse notches in the framing components, so that the notches 23 are parallel and aligned with each other. If desired, the notches 20 can be controlled so as to notch one of the framing components independently of the other component.

Preferably, the notches 23 are in the form of a dado having parallel sides. The notch 23 may be of any desired depth. A depth of approximately ⅛ inch has been found to be effective to secure the vertical stud in the plates. The alignment provided by this arrangement assures that a vertical stud will fit properly between the base plate and the top plate.

Figure 37:
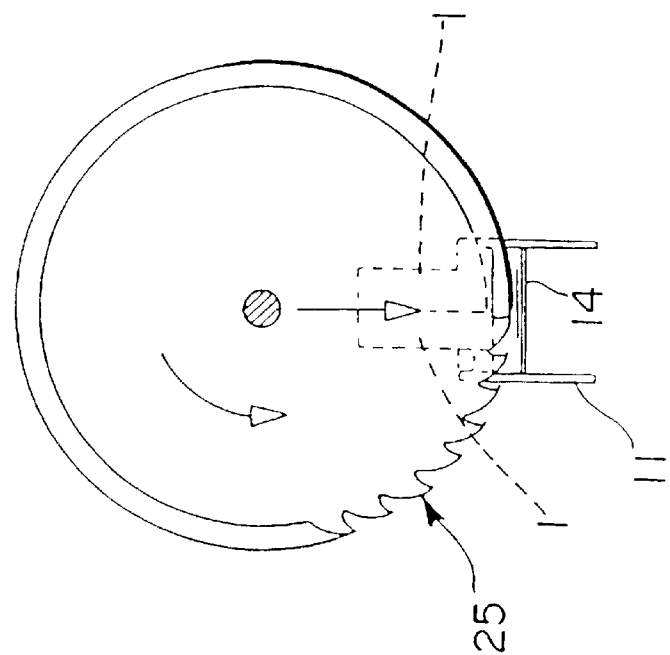
FIGS. 36 and 37 are side views, enlarged for the sake of clarity, of the cut-off saw (cut-off means) of FIGS. 25–28, which is used for the controlled cutting of the notched wall plates.
Figure 36:
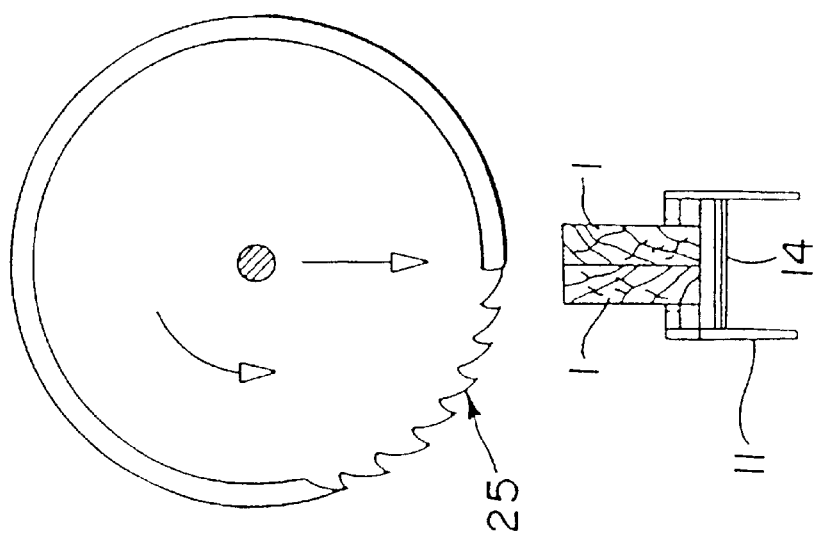

As seen in FIGS. 36 and 37, a cutoff saw 25 is carried by the support rails 11 such that the notching station 20 is positioned between the cutoff saw 25 and the traveling component carriage 15. The cutoff saw 25 is provided for selectively cutting the framing components to a desired length subsequent to the notching operation. During further advancement of the traveling component carriage 15, the components are pushed past the notching station 20 and into operational contact with the cutoff saw 25. Preferably, the cutoff saw is a rotary saw.

Referring back to FIG. 25, the computer system 26 runs the software of the present invention as described above and directly controls operation and movement of the traveling means 15, the notching station 20 and the cutoff saw 25. In this manner, controlled notching and cutting of the framing components, such as studs, wall plates, shelving, lattices and furniture is provided. All controlled components may be connected by standard electrical cables as known to those skilled in the art. The computer 26 receives therein the user's input concerning the dimensions and positioning of the wall panels, studs, etc. that are to form part of the framing. Computer 26 activates each dado-cut saw 24 independently and also controls the sliding and/or pivotal motion of each 20 notching carriage 21 independently by providing individual commands to the carriages 21 and the saws 24. In this manner, the engagement of each dado-cut saw 24 can be controlled to determine the depth of the notch 23 formed in each component 1. Although in most instances, the notches 23 in both components 1 are of identical depth, the apparatus has the capability to produce a notch having a desired depth which may be different in each component 1. The notch 23 may be of a different depth at a first location compared to a second location on the same component 1. It is preferred that each dado-cut saw 24 be shielded for safety purposes.

Figure 40:
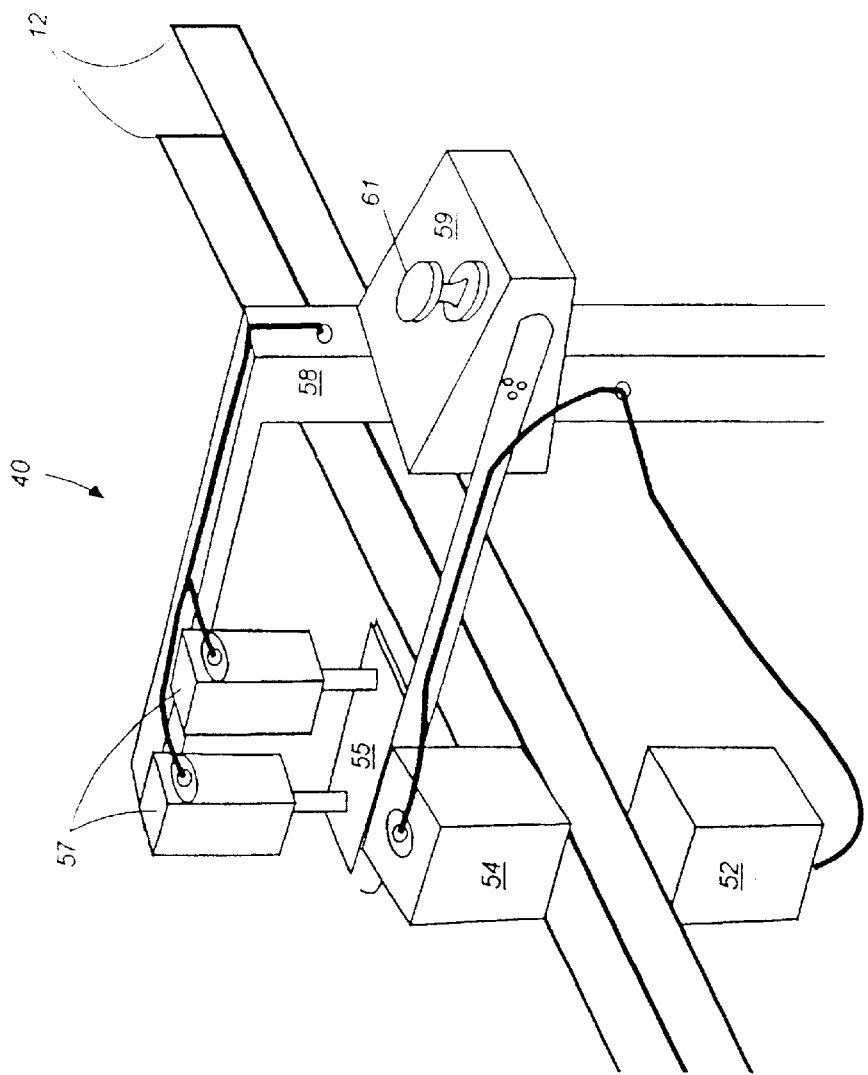
FIG. 40 illustrates an exemplary marking device 40 incorporated in the context if the automated cutting/ notching/marking machine of the present invention.

FIG. 40 illustrates an exemplary marking device 40 incorporated in the context if the automated cutting/notching/marking machine of the present invention. The marking device 40 includes a printer such as an ink jet printer which imparts the marking layout including all location marks, symbols, material, grades and placement information of all intersecting entities.

Lower print head 52 is mounted in a stationary position beneath support rails 11, and an aperture beneath support rails 11 exposes the bottom of components 1 to the lower print head 52.

Upper print head 54 is mounted in vertically movable position directly above the support rails 11 (opposite lower print head 52). The upper print head 54 is attached to a print carriage 55, which in turn is attached to a pair of air cylinders 57. Numatics Co. air cylinders are well-suited for this purpose, and 250 psi models are acceptable. Air cylinders 57 are computer controlled to move upper print head 54 into or out of printing position with respect to component 1 while it is seated in guide rails 11. Both air cylinders 57 may be mounted on an overhanging stationary arm 58. A remote ink well 59 may also attached to carriage 55, and is movable therewith and in fluid connection to supply ink to the upper print head 54. The ink jet print heads 52, 54 and air cylinders 57 are connected by conventional cables and are controlled by the computer 26 which is running the application software described above. In all cases each stud, plate or wall panel may be encoded with an appropriate marking layout (as shown in FIG. 24) as it passes along guide rails 11 to permit a person subsequently assembling the wall panels to properly orient each wall panel and intersecting member with respect to the overall floor plan as designed by the computer. The marking layout as shown in FIG. 24 is transferred directly from the computer to marking device 40 and is imprinted onto framing components to guide subsequent manual cutting, notching and/or assembly.

The operation of the notching and marking apparatus 10 will now be discussed with reference to the exemplary preparation of a wall plate. The operation is similar for other components for other applications and the following is provided as a typical example and not as a limitation.

Following the detailed flow-chart of FIGS. 4a through 4f, a user enters all necessary floorplan data into the computer, and the program designs door and window openings, tees, corners, electrical fixtures, etc. and enters the information into the aforesaid database. The length, width and location of all walls is defined, as are wall heights, stud spacing, material, grades and sheathing locations. The computer automatically assigns truss direction, spacing, depth, loading, etc., and automatically prepares a layout of walls and trusses to place all individual components in each wall panel. The parts placement listing for each panel is recorded in a file for subsequent determination of commands for the notching station 20. The computer 26 defines the order in which the panels are to be notched and stacked. The computer 26 then controls all robotic movement to notch the components, cut the components to the required length, mark subassembly locations, panel numbers, truss 20 system component locations and wall intersection locations. In this manner, panels can be assembled either at the site of the apparatus 10 disclosed herein or at a remote site using the markings on the components. Component markings are provided for assembly of a full architectural plan or layout.

Figure 27:
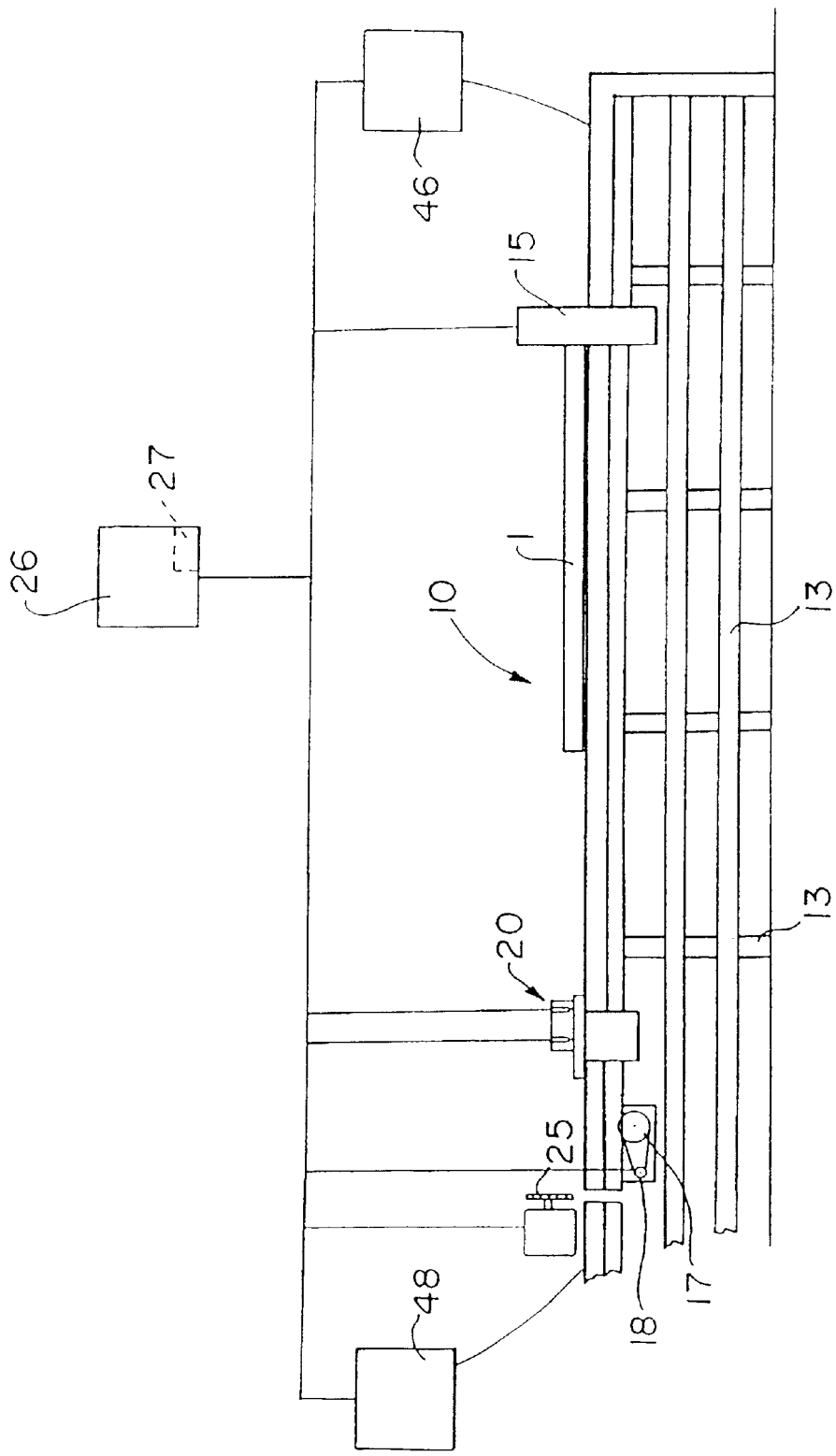
FIG. 27 is a diagrammatic side view of the cutting and notching assembly of the present invention illustrating the initial position of the clamped wall plates to be notched and cut.

As shown in FIGS. 26 and 27, wall plates 1 (a horizontal bottom wall plate and a top wall plate that is to be parallel thereto) are placed on the guide rails 12 and gripped within the traveling means 15 by gripping fixture 22.

An existing automatic feeder assembly may be used to load the wall plates 1 onto the machine table without any intervention by the operator.

For the purpose of example only, the base plate 1 and the top plate 1 (as well as the stud that is to be located therebetween) are wood 2×4's, and the notches are to be cut along the width of the respective 2×4's.

As shown in FIGS. 27 and 28, the computer 26 activates the stepper/drive motor 18 to move the traveling component carriage 15 in the first direction until the traveling component carriage 15 contacts and engages the wall plates 1, and pushes (moves or advances) the plates 1 into the notching station 20. Marking assembly 40 marks the base plate 1 and the top plate 1 to encode each plate with specific information to permit a person subsequently assembling the wall plates 1 and the studs, to properly orient each wall plate with respect to the overall layout designed by the computer. The marking assembly also transfers additional information unrelated to the attachment of structural members but relates to the placement with respect to other building materials and elements within the structure. At least one, and preferably two, wedging means 42 are mounted on the frame 13. The wedging means 42 are activated by the computer 26 and apply up to 500 psi pressure against the clamped wall plates 1 to reduce distortion in the plates before notching. In a preferred embodiment, the wedging means 42 has a substantially rectangular block disposed immediately adjacent to the teeth of the dado-cut saw 24. The block is attached to a piston which is received in a cylinder. The piston is moved into and out of the cylinder as controlled by the computer 26 to move the wedge into contact or out of contact with the wood components 15. Hydraulic, pneumatic or electrical power may be used to power movement of the piston. The piston/cylinder may be perpendicular to the wood components or may be at an angle, as long as movement of the block is produced to wedge the plate 1 firmly. The drive motor 17 is then stopped, and the double-sided notcher cycles and both dado-cut saws 24 are advanced inwardly and downwardly into contact with the wall plates 1, so that a first pair of the desired notches are cut transversely in the wood plates 1 to a desired depth. The notches are parallel and aligned with each other. The dado-cut saws 24 on both sides are retracted from contact with the wall plates 1. A flexible vacuum tube may be connected to the notching station 20 to collect shavings and dust generated during the notching procedure and to carry the waste away from the work area. The stepper/drive motor 18 is then reactivated and the traveling component carriage 15 incrementally advances the wall plates 1 by a predetermined length into a second desired position on the plates 1. A second double-sided notching operation then takes place in 10 which the dado-cut saws 24 are advanced inwardly and upwardly into engagement with the clamped plates 1, thereby forming a second pair of aligned notches 23 in the wall plates 1 spaced apart from the first pair of aligned notches 23. The stepper/drive motor 18 may then be reactivated to move the 15 wall plates 1, as desired, and the above-described process may be repeated as many times as desired for forming a plurality of pairs of spaced-apart transverse notches 23 along the length of the top and base plates 1. The dado-cut saws 24 move sequentially inwardly, downwardly, outwardly, inwardly, upwardly and outwardly. The arrangement insures that the respective pairs of notches 23 formed in the plates 1 will be properly aligned, and that a vertical stud will fit snugly between the two plates. When all desired notches 23 have been cut, the stepper/drive motor 18 is reactivated, so as to further advance the plates 1 past the notching station 20 and into operational contact with the cutoff saw 25.

Once in position, the computer 26 stops the operation of the traveling component carriage 15, and the cut off saw 25 is activated to selectively cut the wall plates. The computer may control an automated device to remove the finished plates 1.

The computer 26 repeats the above-described process as many times as necessary for notching and cutting the requisite number of wall plates. The spacing between the notches 23 and the length of each pair of wall plates 1 is determined by the computer program. A quality control feature of the system is a plurality of sensors 44 mounted on the traveling component carriage 15, the dado-cut saws 24, the cut-off saw 25, the marking means 40, the wedging means 42 and other critical portions of the device. Each sensor provides feedback to the computer to ensure each step is occurring in the proper sequence and that each component has been activated/deactivated as needed. It is also preferred that means 48 be provided to remove or unload the notched components 1 from the frame 11 after the cut-off saw 25 has cut the components 1 to the desired length. The controller means 26 provides the commands to the unloader means 48 at the proper time to remove the notched components 1. In this manner, the entire sequence of operations from the loading of the components 1 onto the apparatus through the notching 5 and the removal of the notched components 1, is controlled by the controller means 26 without participation or intervention of a human operator.

Figure 41:
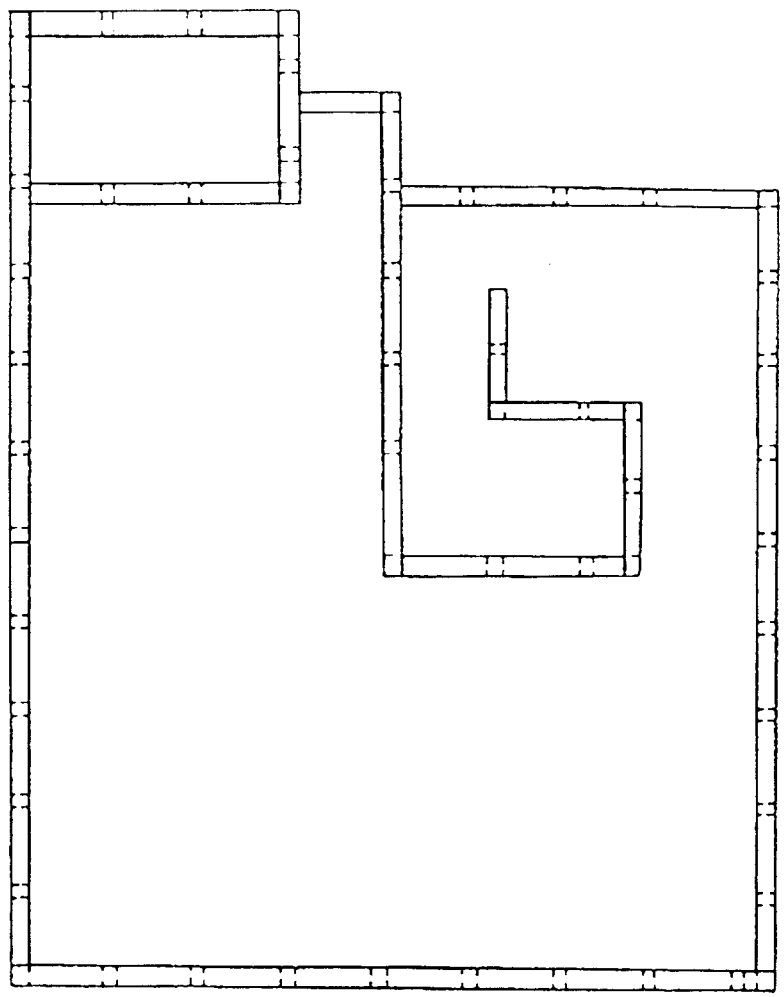
FIG. 41 shows a floor plan which is exemplary of the number and placement of the notched studs which form the wall panels on one story of a typical building.
Figure 42:
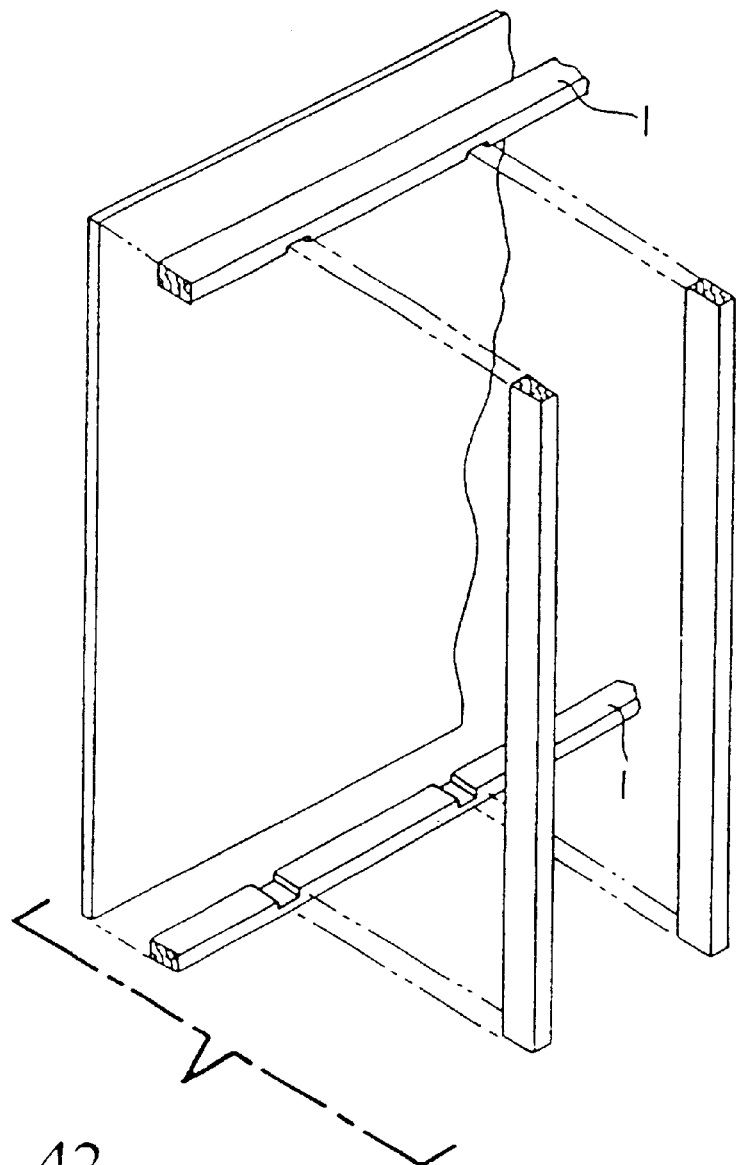
FIG. 42 is an assembly diagram of a wall frame manufactured in accordance with the following invention.

FIG. 41 shows a floor plan which is exemplary of the number and placement of the notched studs which form the wall panels on one story of a typical building. Once selectively notched and cut in the manner described above, the finished plates may be removed from the arrangement 10 and placed on an assembly table. As illustrated in the assembly diagram of FIG. 42, the studs and the components may be pieced together and fastened in place by, for example, nailing.

Operation of the present device to automatically and directly transfer a marking layout onto the framing components 1 will be described for subsequent controlled cutting, notching, and placement.

Referring back to the block diagram FIG. 4e, at step 330, the Floor plan database is translated into a marking layout for marking studs to be cut by a sawyer and assembled. The marking layout can be previewed by selecting PLATE CUTTING PREVIEW on the Primary Editing Screen of FIG. 1. The Plate Cutting Preview screen of FIG. 24 shows a top view of the selected Plate Component with marks for notches to be cut in accordance with the assigned stud spacing. To automatically and directly transfer the layout onto a framing component, a wood component 1 is fed into the guide rails 11, and automatic marking of component 1 is accomplished by marking device 40 while component 1 is manipulated by the moving component carriage 15. It is important to note that marking of plate 1 may be performed independently of notching by employing those elements of the device of FIG. 25 and the marking assembly of FIG. 40 as necessary for marking, and notching station 20 may be omitted.

The present invention may also be adapted for portability so that it can be moved to a job site and set up in the immediate vicinity of the construction to reduce transportation and material costs and to expedite construction. A portable arrangement has the same fundamental components as the arrangement described above and is operated in the same manner. Because the arrangement of the present invention guarantees that the notches 23 formed in the parallel wall plates 1 are aligned, it assures the proper positioning of the studs in the frame and precludes subsequent misalignment of the studs due to warping or the like.

The arrangement 10 described above is also useful for producing sole plates members having shallow recesses or rabbets formed therein for locating and receiving the lower ends of studding. With this device, there is no human intervention throughout the layout or dimensioning process, and assemblers are compelled to place the studding properly in the notches. The aligned notches prevent the material from twisting after manufacturing. Structural advantages are also provided by the notches because they stabilize the walls and improve design values. However, if desired, the arrangement may be manually controlled to position the plates, activate the notcher and cut the plates. Moreover, there are indirect advantages in constructing wall plates in accordance with the present invention before shipment to the job site. This allows debugging of the plans on the computer. A larger volume of business can be completed in a relatively small space. Freight dollars are saved by not shipping defective components and by having no excess material in the shipment since all components are precut to the required dimensions. Additional savings in shipping costs can be obtained by shipment of the unassembled wall plates which have been appropriately marked by the marking means 40. All of the intervening space in the framed unit is saved and shipping costs are significantly reduced. However, when the wall plates are received on site, the consumer must provide studs cut to proper lengths and must assemble the wall plates and studs as directed by the markings on the wall plates 1 and the layout.

Although the example described above is directed to wall plates and components for architectural plans, the device is also useful with any members which require notching in a controlled and production environment. Shelving, furniture and containers are other end products which are amenable to use of the present device.

It will be readily appreciated by those skilled in the art, that the apparatus of the present invention may find application for shaping and surface treatment especially of any wood components. For this purpose, the notchers can be replaced by any appropriate wood-working means, for instance, abrasive wheels, shaping means, etc.

The above-described example is also directed to automatic cutting and notching of wall plates and components. Alternatively, the floor plan may be translated into a marking layout for quantifying the framing information, and this information can be transferred automatically and directly onto framing components to guide subsequent cutting, notching and/or placement of associated members. An example of this marking will now be described.

Obviously, many modifications may be made without departing from the spirit of the present invention. Accordingly, it will be appreciated by those skilled in the art that within the scope of the appended claims, the invention may be practiced other than has been specifically described herein.

Industrial Applicability

Framing is a common method for the construction of buildings having up to four stories. The placement of the components in the building is determined by a set of construction documents called blueprints. The blueprints define each and every dimension and location for every component in the building. However, mistakes can easily be made throughout the process. First, mistakes can be made when formulating the blueprints. Second, mistakes can be made when reading and transferring marker information from the blueprints to the wood components. Third, mistakes can be made by mis-cutting the components. Finally, mistakes may be made at the assembly point by misunderstanding the marker information or missing the mark when nailing. There have been relatively few prior efforts to automate the framing process, and only a few computer systems for generating 3D models of framed structures for construction purposes. Thus, there clearly remains a need for a system which provides a parametric modeling program that allows a user to quickly and conveniently generate 3D models of framed structures, a marking layout for quantifying the framing information, and a process for automatic computerized transfer of the marking layout onto framing components for controlled cutting, notching and assembly thereof.

What is claimed is:

1. An apparatus for notching wood components, comprising:

an elongate supporting frame;

an automatic notching station carried by the supporting frame, said notching station including a notching tool having at least one dado-cut saw for notching said wood components, and a notching carriage pivotally and transversely articulated to said frame for moving said notching tool into cutting contact with said wood components;

a traveling component moving carriage supported by and selectively positionable lengthwise along said supporting frame for advancing wood components into a notching position relative to said notching station;

a programmable controller connected to said automatic notching station and component moving carriage for coordinating and controlling operation thereof, said programmable controller sequentially advancing said wood components into notching position relative to said notching station, moving said notching tool into cutting contact with said wood components, and automatically notching said wood components in accordance with predetermined design considerations.

2. The apparatus for notching components according to claim 1, further comprising a cut-off saw carried by the support means and connected to said programmable controller for cutting the components to a required length.

3. The apparatus of claim 1, wherein the components include a pair of identical components brought into contact therewith.

4. The apparatus of claim 3, wherein the notching tool is a double-sided notching assembly, and said component moving carriage moves said pair of identical components into operational contact with the double-sided notching assembly for notching both components simultaneously.

5. The apparatus of claim 1, wherein the notching station includes a pair of notching tools carried by a pair of notching carriages.

6. The apparatus of claim 5, wherein the pair of notching tools further comprises first and second dado-cut saws, respectively secured to the supporting frame by a first and a second notching carriage.

7. The apparatus of claim 1, further including a marking assembly for marking each component with a marking layout to facilitate assembly of said components in a predetermined order.

8. The apparatus of claim 1, wherein the programmable controller comprises a computer.

* * * * *